United States Patent
Nogami et al.

(10) Patent No.: US 9,701,027 B2
(45) Date of Patent: Jul. 11, 2017

(54) ROBOT

(71) Applicant: KABUSHIKI KAISHA YASKAWA DENKI, Kitakyushu-shi (JP)

(72) Inventors: Kazuyoshi Nogami, Kitakyushu (JP); Nobukazu Miyauchi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 168 days.

(21) Appl. No.: 14/083,310

(22) Filed: Nov. 18, 2013

(65) Prior Publication Data
US 2014/0137689 A1 May 22, 2014

(30) Foreign Application Priority Data
Nov. 19, 2012 (JP) .................... 2012-253262

(51) Int. Cl.
*H01R 13/58* (2006.01)
*B25J 18/00* (2006.01)
(Continued)

(52) U.S. Cl.
CPC .......... *B25J 18/00* (2013.01); *B25J 9/0087* (2013.01); *B25J 19/0029* (2013.01); *B25J 1/08* (2013.01);
(Continued)

(58) Field of Classification Search
CPC ............. H01R 13/567; H01R 13/5825; B25J 19/0025; B25J 1/08
(Continued)

(56) References Cited

U.S. PATENT DOCUMENTS 4,378,959 A * 4/1983 Susnjara ............ B05B 13/0431
414/732
4,904,148 A * 2/1990 Larsson .................... B25J 9/04
414/680
(Continued)

FOREIGN PATENT DOCUMENTS

CN 102114634 7/2011
CN 102218743 10/2011
(Continued)

OTHER PUBLICATIONS

Japanese Office Action for corresponding JP Application No. 2012-253262, May 1, 2014.
(Continued)

*Primary Examiner* — William Kelleher
*Assistant Examiner* — Randell J Krug
(74) *Attorney, Agent, or Firm* — Mori & Ward, LLP

(57) ABSTRACT

A robot includes a base and a robot main body. The robot main body includes a plurality of structural members driven by a plurality of actuators. The base includes a housing into which a control cable drawn, a first opening portion provided on a lower surface of the housing, and a second opening portion provided on a side surface of the housing. The first opening portion is configured capable of selectively attaching/detaching either one of a first connector plate including a connector to which a tip end portion of the control cable can be attached and a first lid portion not including the connector. The second opening portion is configured capable of selectively attaching/detaching either one of a second connector plate including a connector to which a tip end portion of the control cable can be attached and a second lid portion not including the connector.

9 Claims, 23 Drawing Sheets

(51) Int. Cl.
*B25J 9/00* (2006.01)
*B25J 19/00* (2006.01)
*H01R 13/56* (2006.01)
*B25J 1/08* (2006.01)

(52) U.S. Cl.
CPC ........ *H01R 13/567* (2013.01); *H01R 13/5825* (2013.01); *Y10S 901/27* (2013.01); *Y10T 74/20329* (2015.01)

(58) Field of Classification Search
USPC .......................................... 74/490.03, 490.02
See application file for complete search history.

(56) References Cited

U.S. PATENT DOCUMENTS

| | | | | |
|---|---|---|---|---|
| 5,115,690 | A * | 5/1992 | Torii | B25J 9/047 74/490.02 |
| 5,212,432 | A * | 5/1993 | Ohtani | B25J 9/046 310/56 |
| 5,437,207 | A * | 8/1995 | Zimmer | B23K 11/318 414/918 |
| 5,564,312 | A * | 10/1996 | Brunman | B25J 19/0029 414/918 |
| 5,749,058 | A * | 5/1998 | Hashimoto | B25J 9/1674 318/568.11 |
| 6,477,913 | B1 * | 11/2002 | Akeel | B25J 19/0029 414/680 |
| 7,104,153 | B2 | 9/2006 | Matsumoto | B25J 19/0029 74/490.01 |
| 7,841,256 | B2 * | 11/2010 | Hama | B25J 9/06 74/490.05 |
| 2001/0034155 | A1 | 10/2001 | Shimogama et al. | |
| 2009/0249606 | A1 * | 10/2009 | Diez | B23K 11/11 29/428 |
| 2011/0127083 | A1 * | 6/2011 | Karlinger | B25J 19/0029 174/70 R |
| 2011/0154933 | A1 | 6/2011 | Liu et al. | |
| 2011/0252915 | A1 | 10/2011 | Nakagiri et al. | |
| 2011/0314949 | A1 * | 12/2011 | Long | B25J 19/0029 74/490.04 |
| 2012/0103125 | A1 | 5/2012 | Liu | |
| 2013/0047771 | A1 * | 2/2013 | Liu | B25J 19/0029 74/490.02 |
| 2013/0260606 | A1 * | 10/2013 | Hahakura | H01R 13/60 439/534 |
| 2014/0137685 | A1 * | 5/2014 | Iwayama | B25J 18/00 74/490.02 |

FOREIGN PATENT DOCUMENTS

| | | |
|---|---|---|
| CN | 102452079 | 5/2012 |
| EP | 1491300 | 12/2004 |
| JP | 60-166260 U | 11/1985 |
| JP | 62-064211 | 3/1987 |
| JP | 02-100892 | 4/1990 |
| JP | 05-96487 | 4/1993 |
| JP | 05-138577 | 6/1993 |
| JP | 07-124887 | 5/1995 |
| JP | 2001-273947 | 10/2001 |
| JP | 2009-113188 | 5/2009 |
| JP | 2010-94749 | 4/2010 |

OTHER PUBLICATIONS

Japanese Office Action for corresponding JP Application No. 2012-253262, Dec. 3, 2013.

Chinese Office Action for corresponding CN Application No. 201310581176.6, May 27, 2015.

* cited by examiner

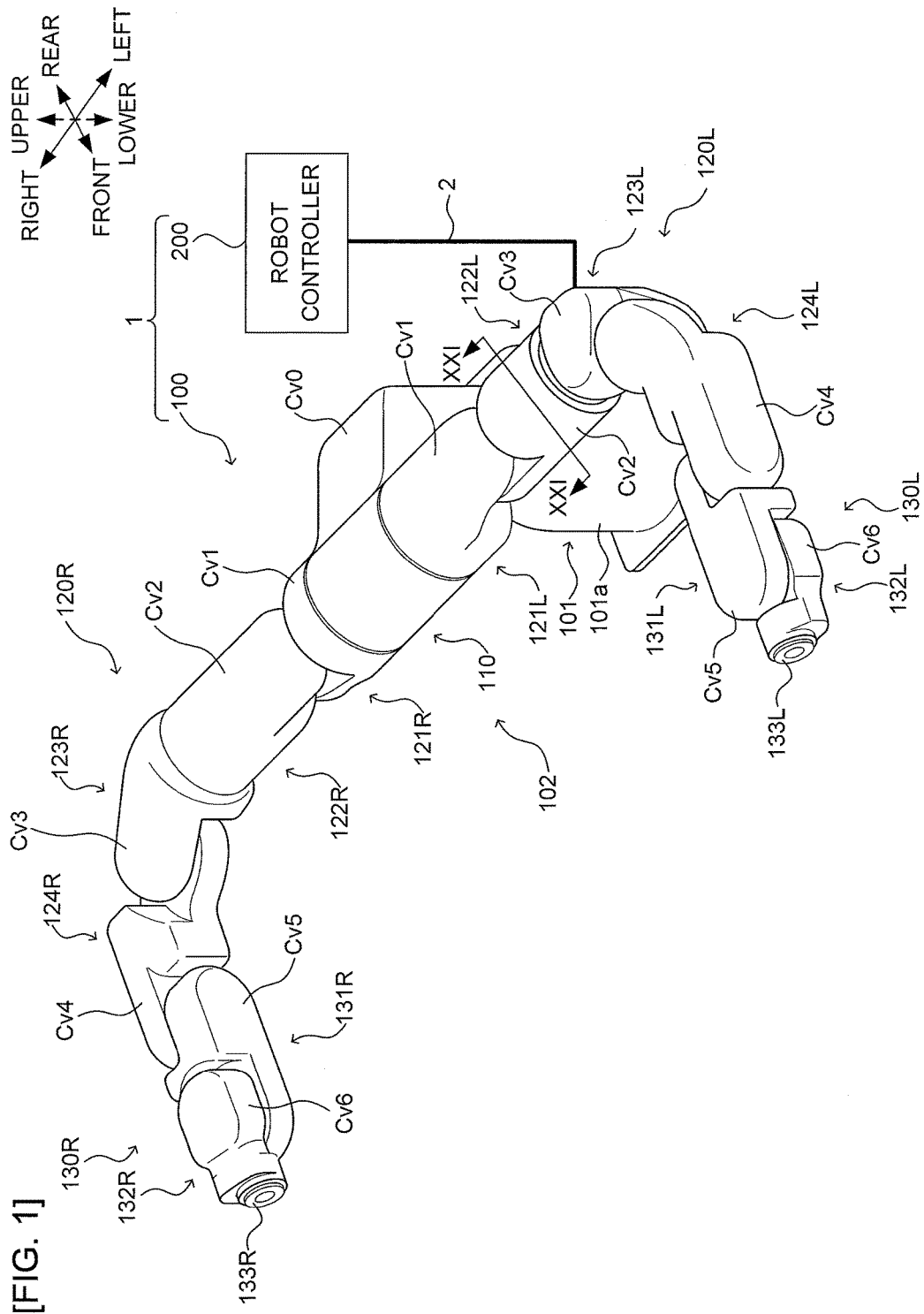
[FIG. 1]

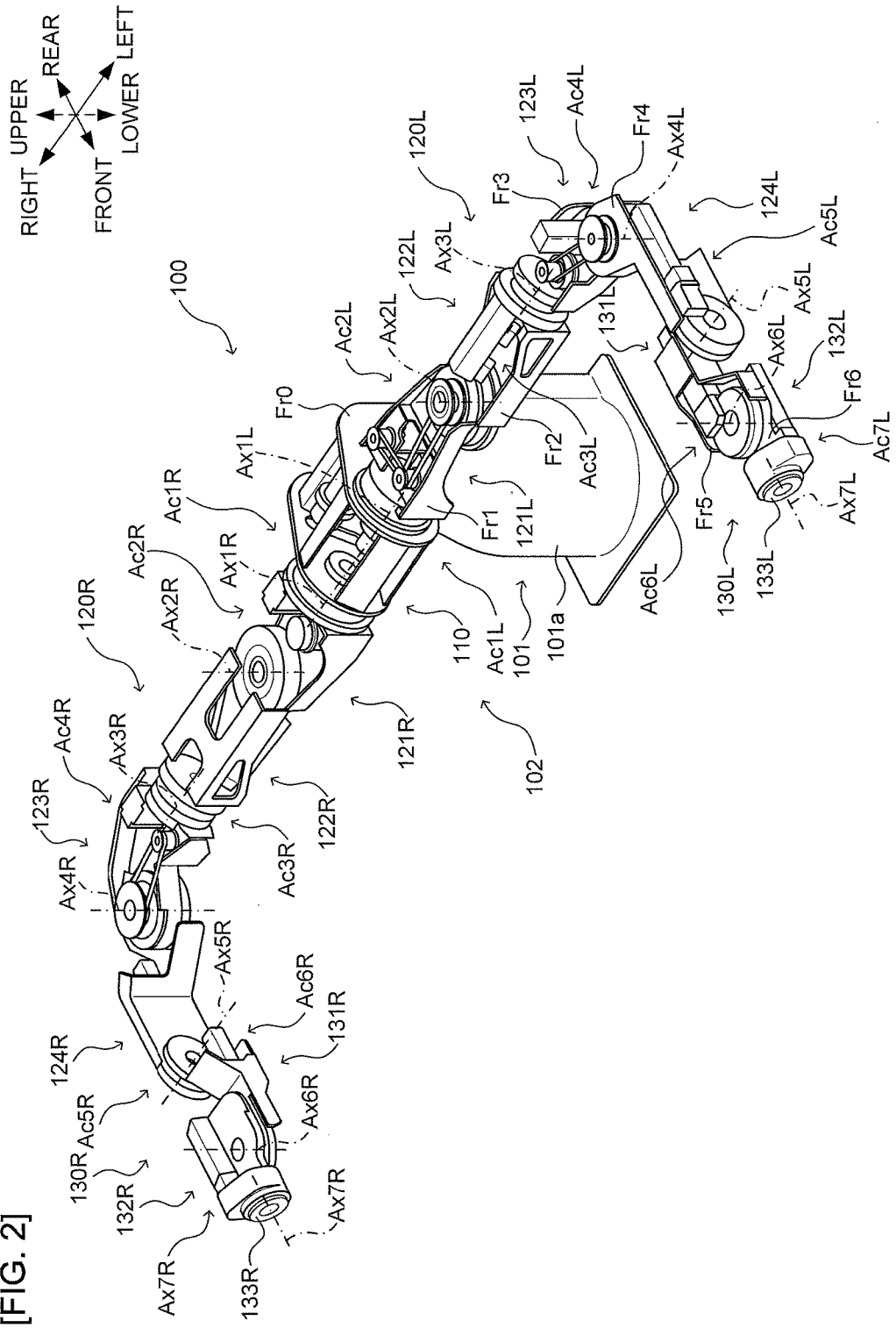
[FIG. 2]

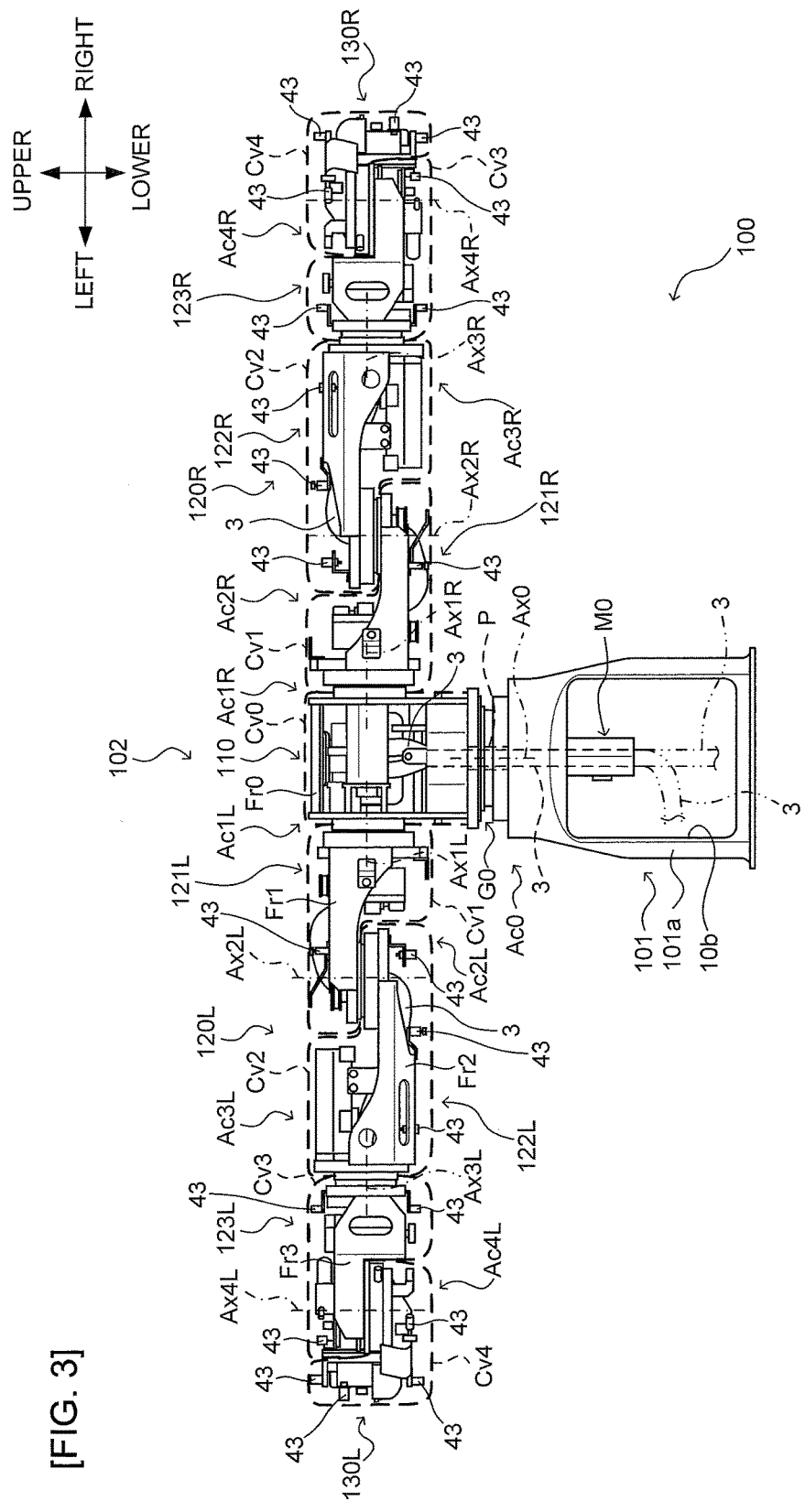
[FIG. 3]

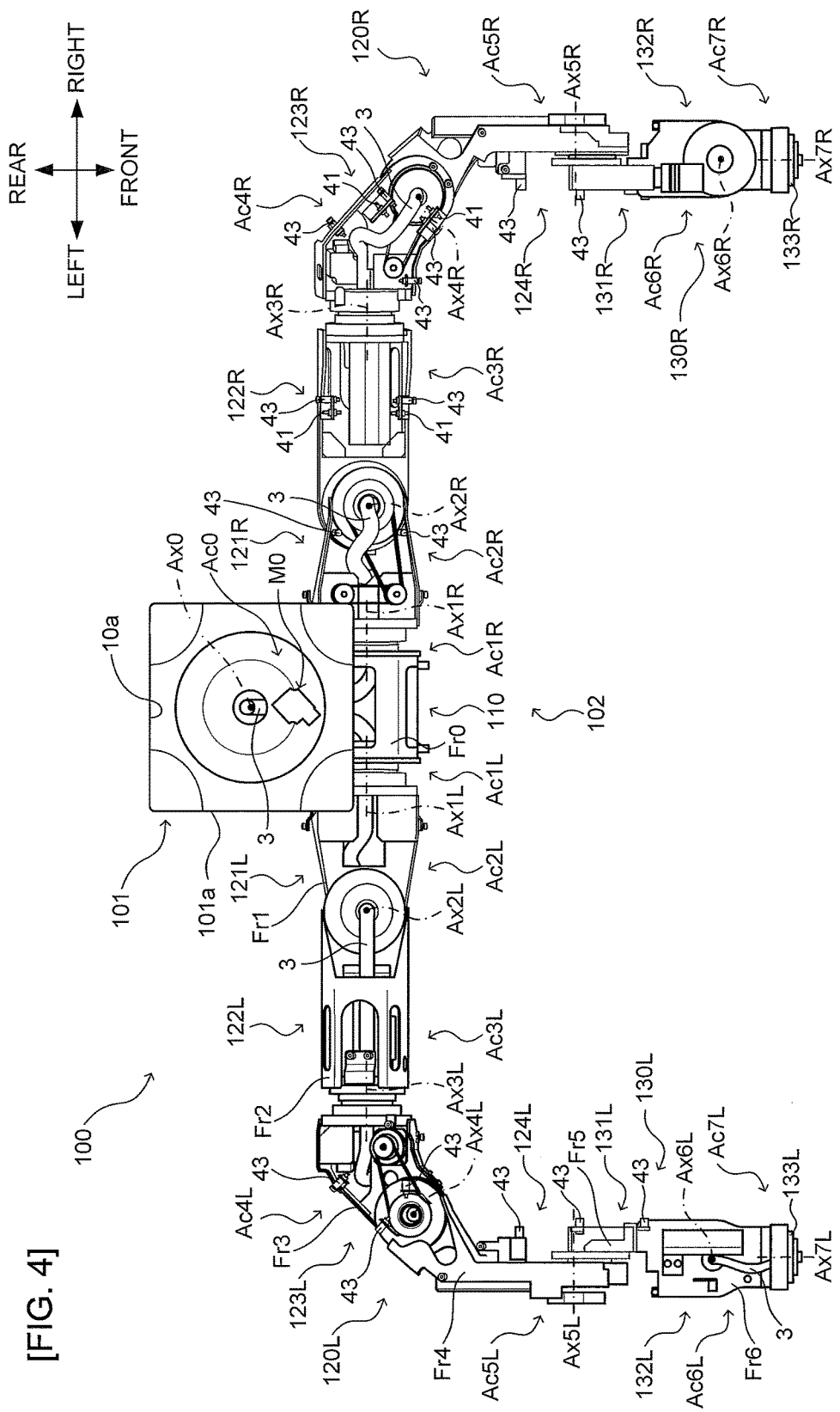
[FIG. 4]

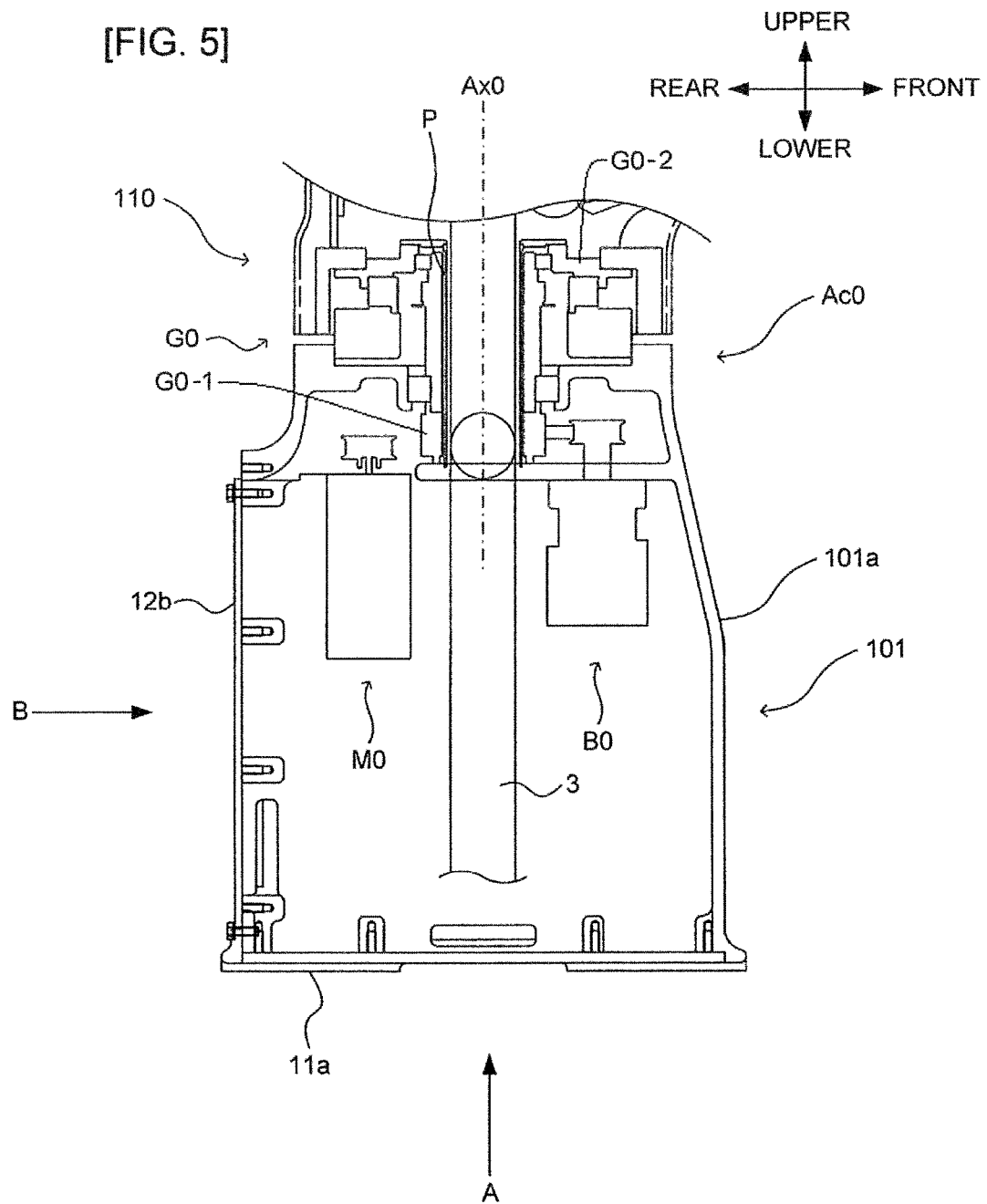

[FIG. 6A]
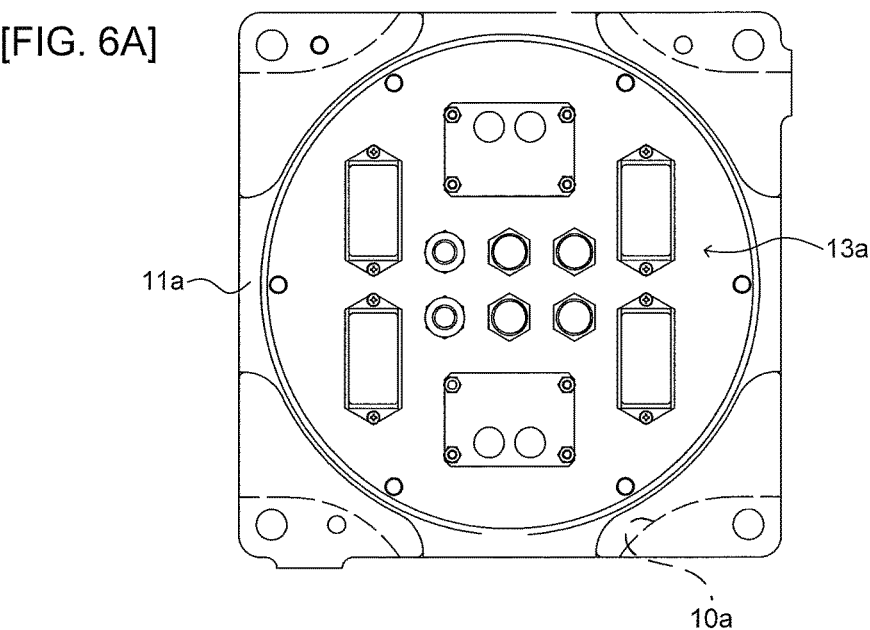
[FIG. 6B]
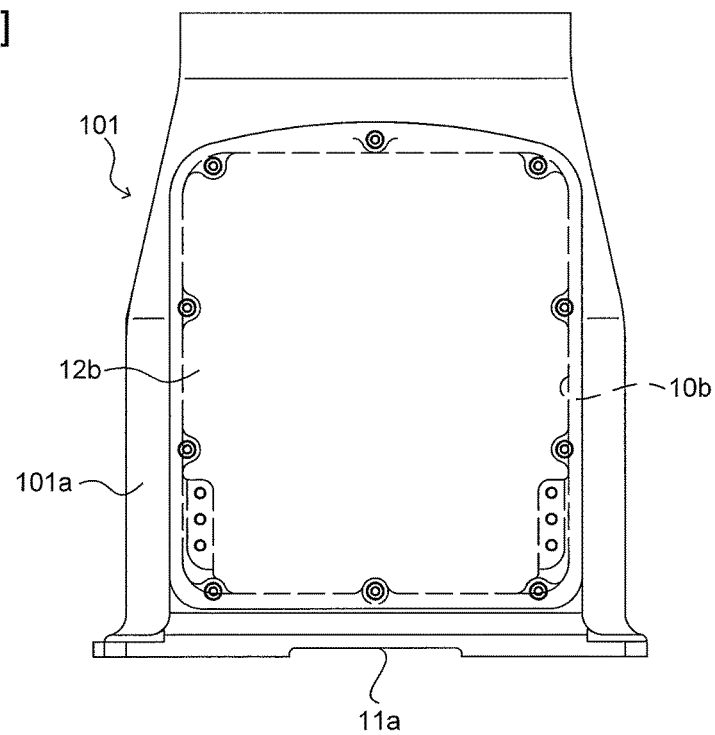

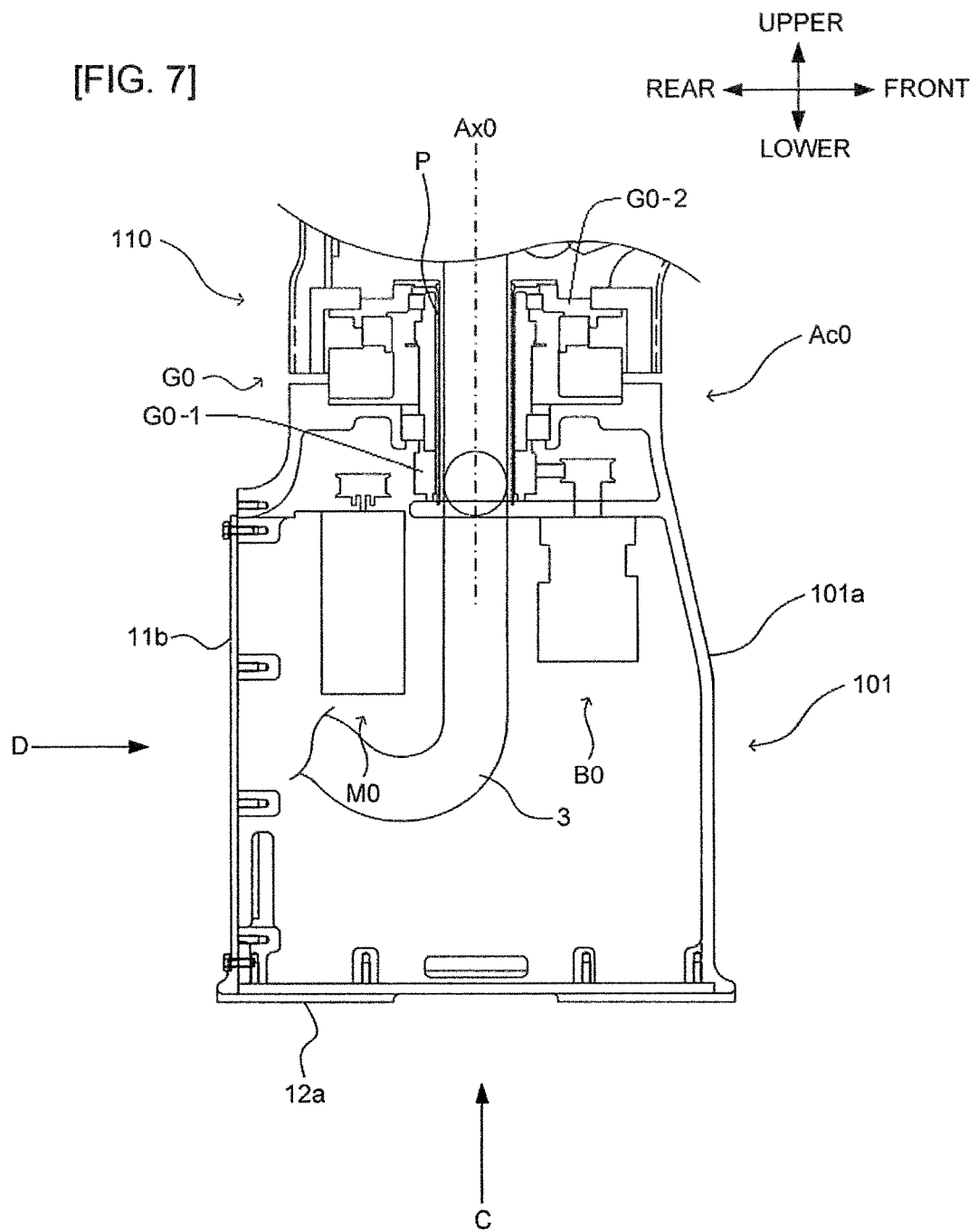

[FIG. 8A]
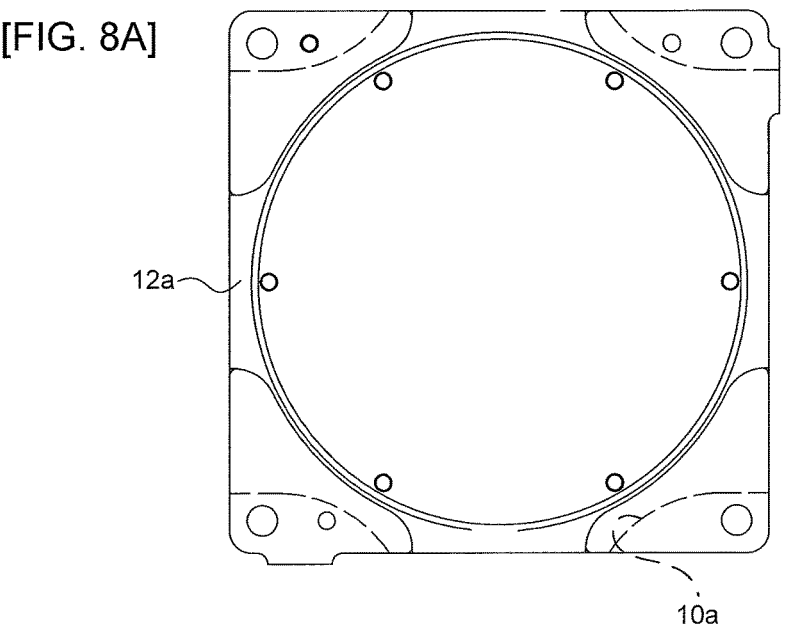
[FIG. 8B]
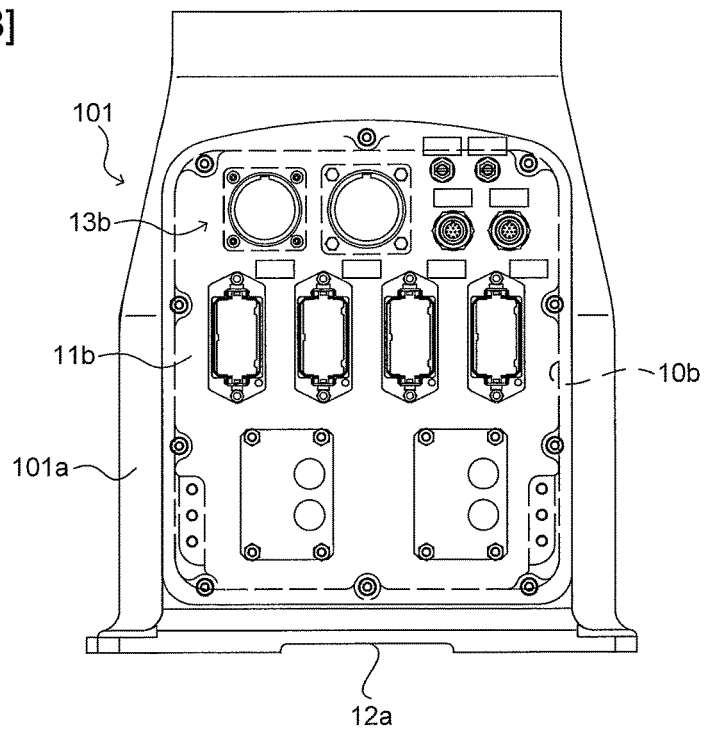

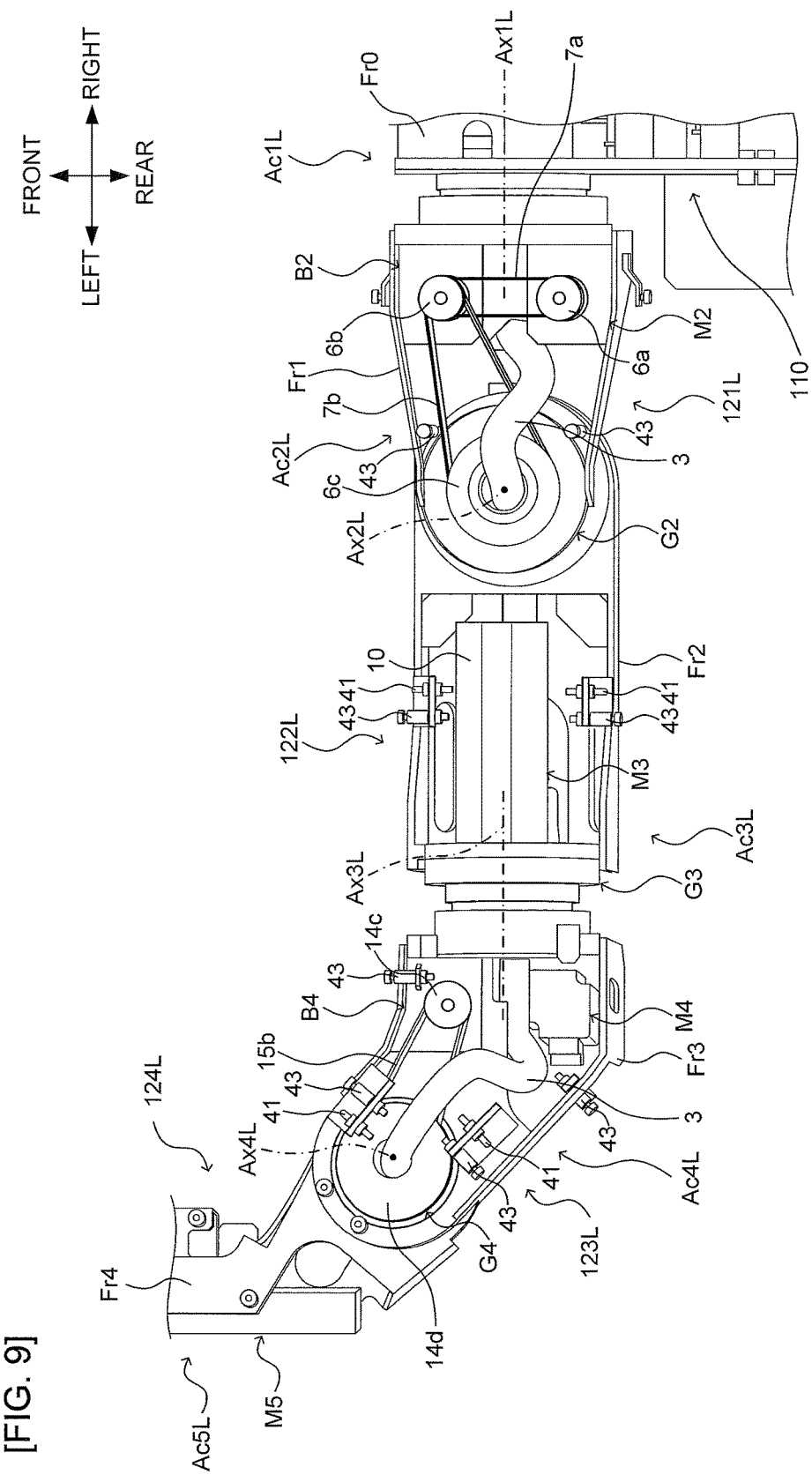
[FIG. 9]

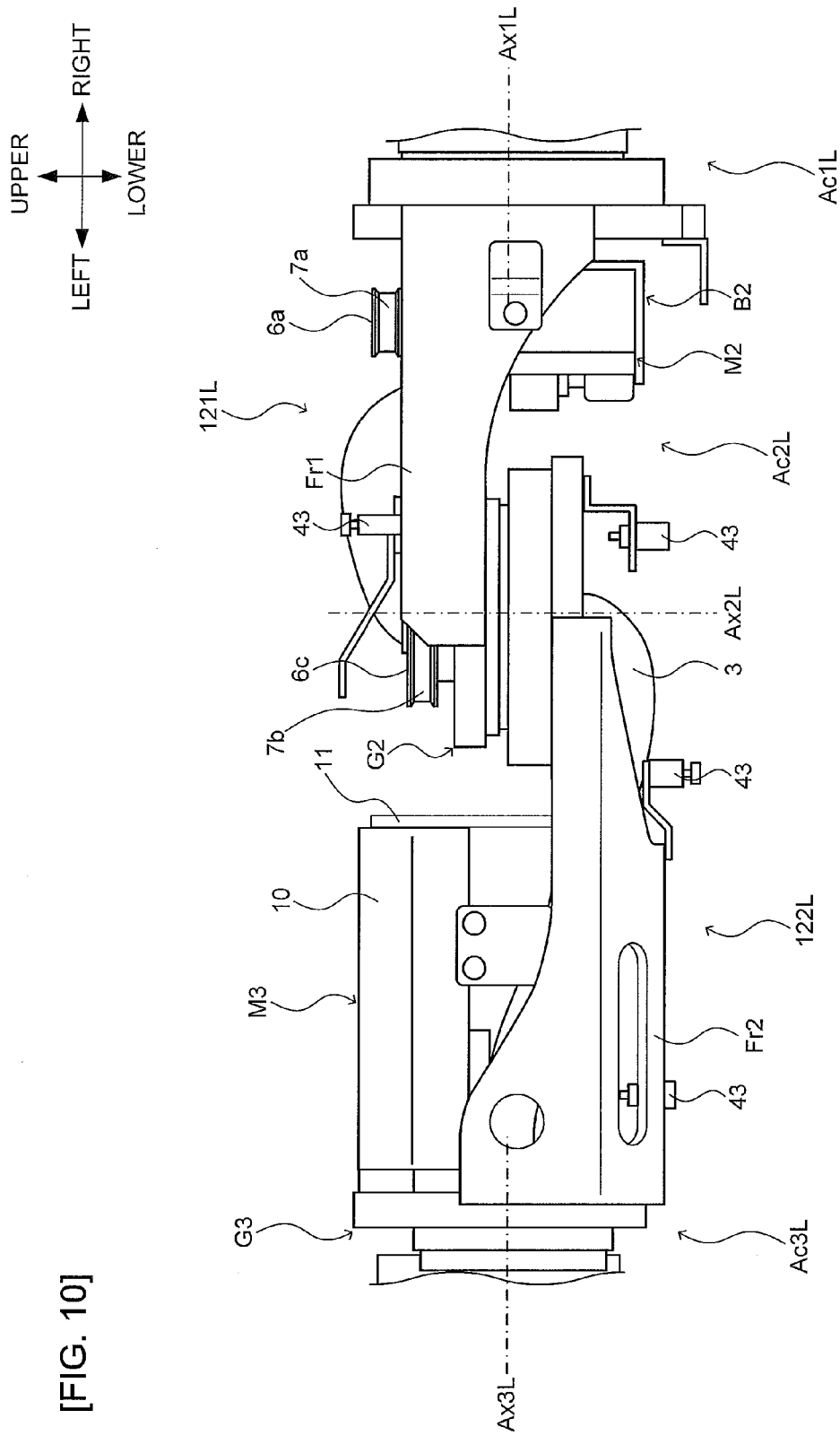
[FIG. 10]

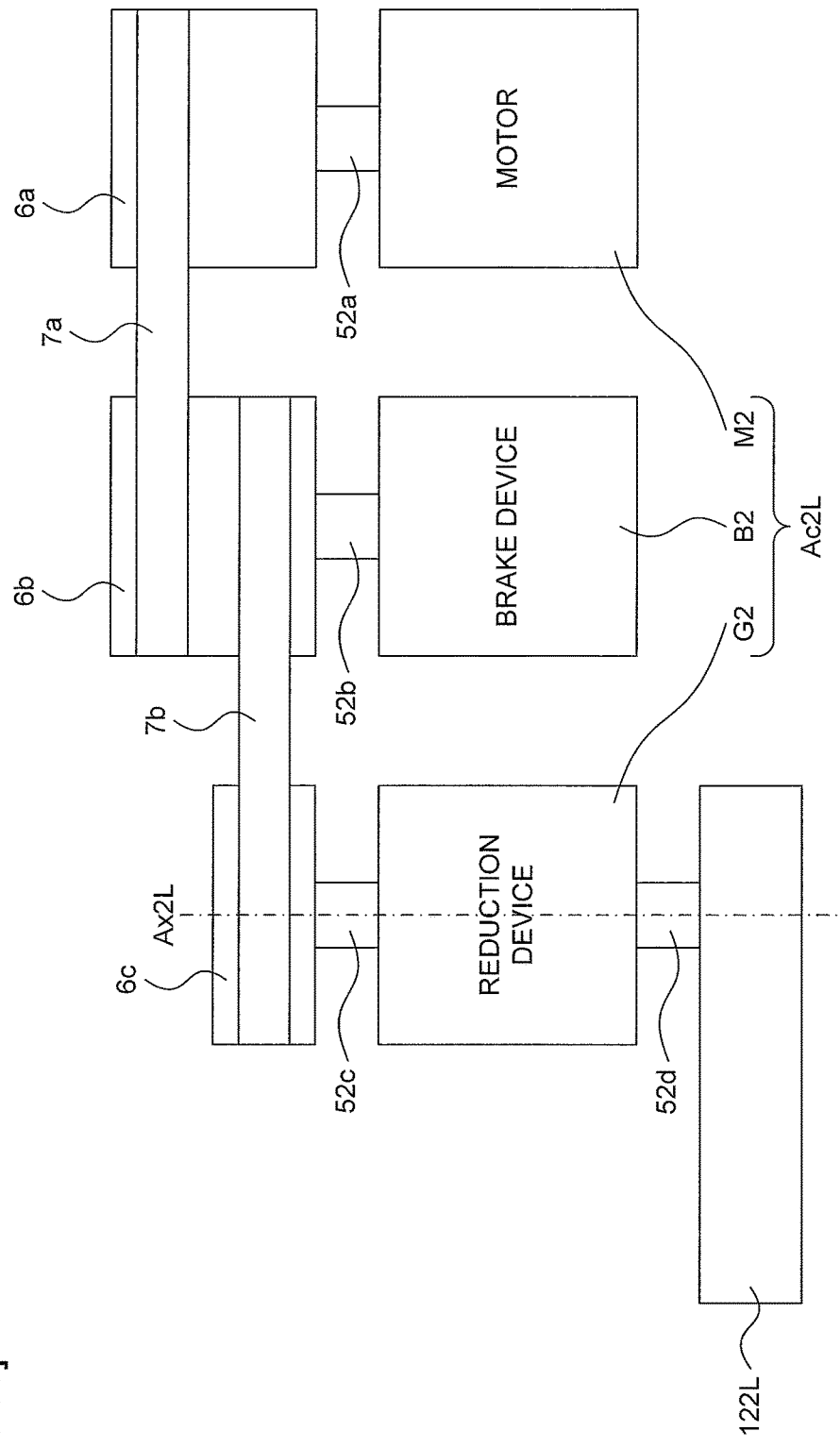
[FIG. 11]

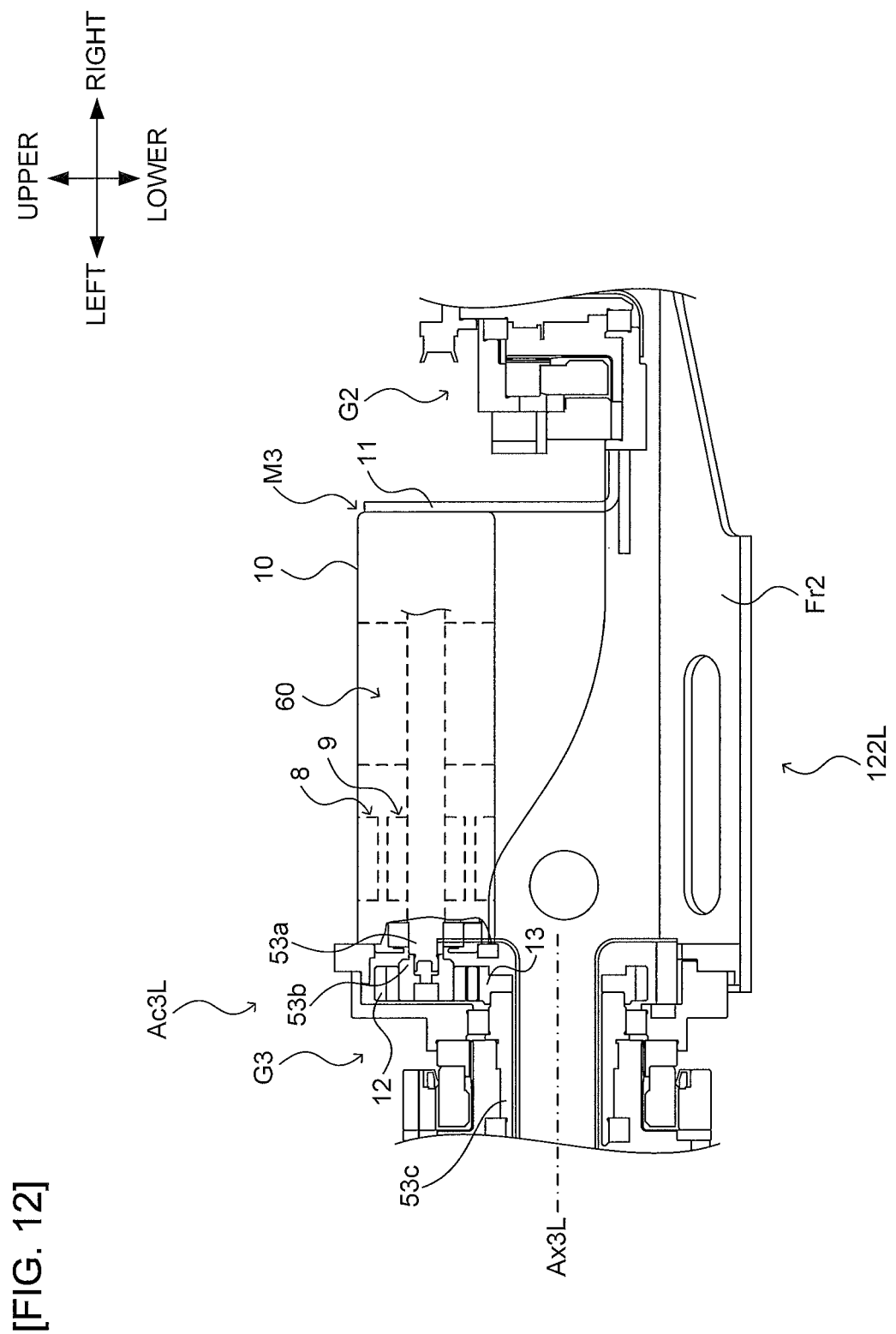
[FIG. 12]

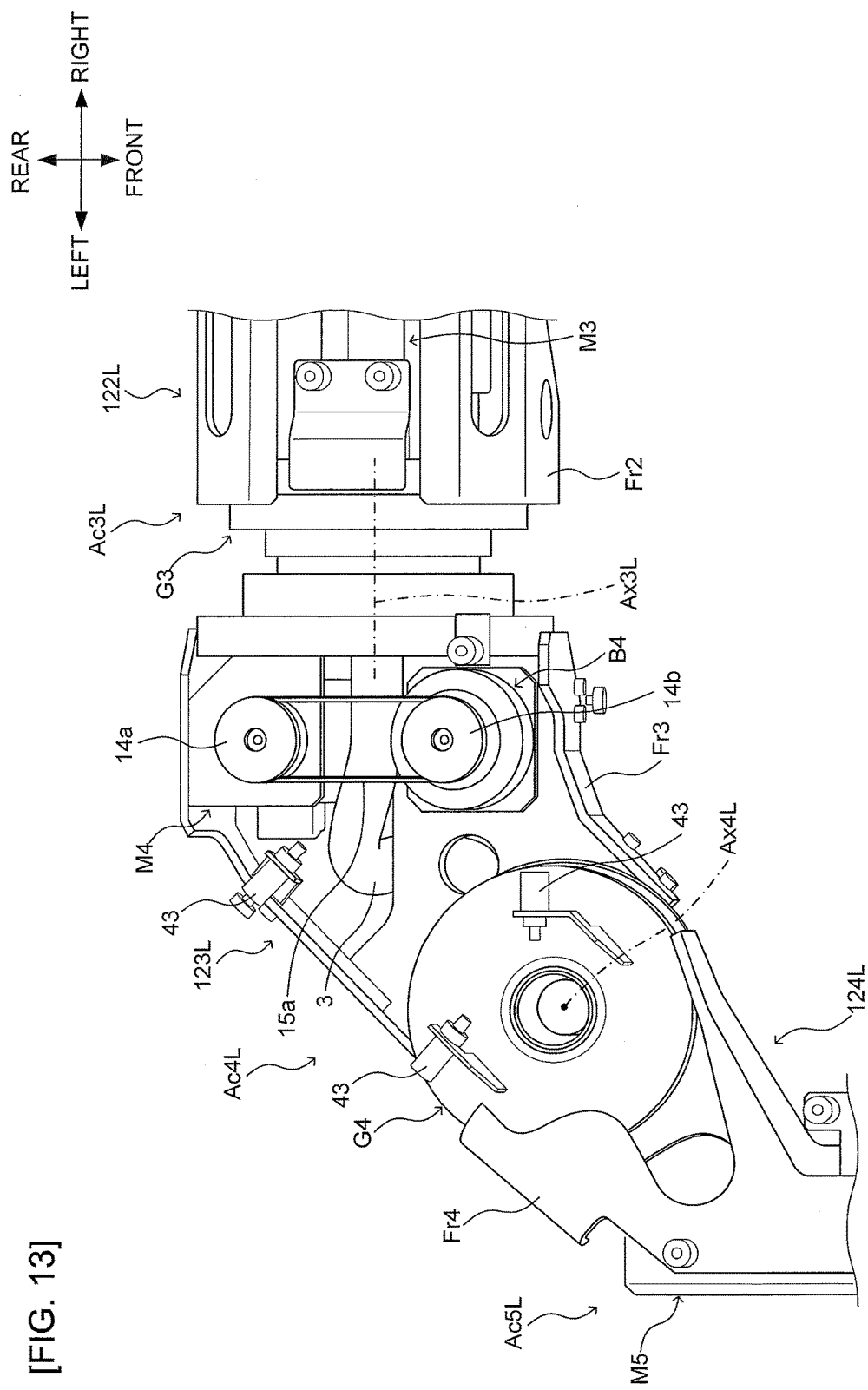
[FIG. 13]

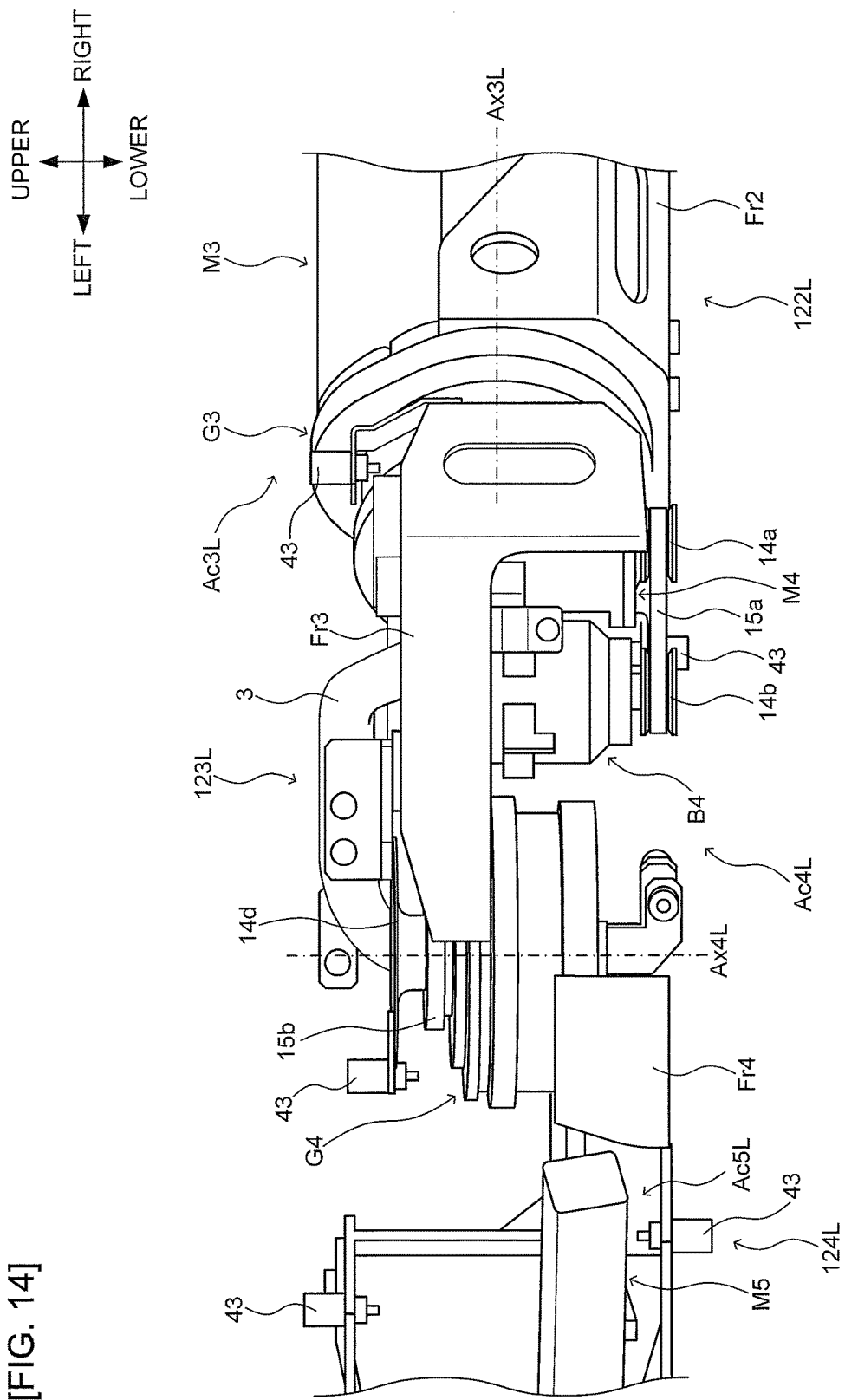

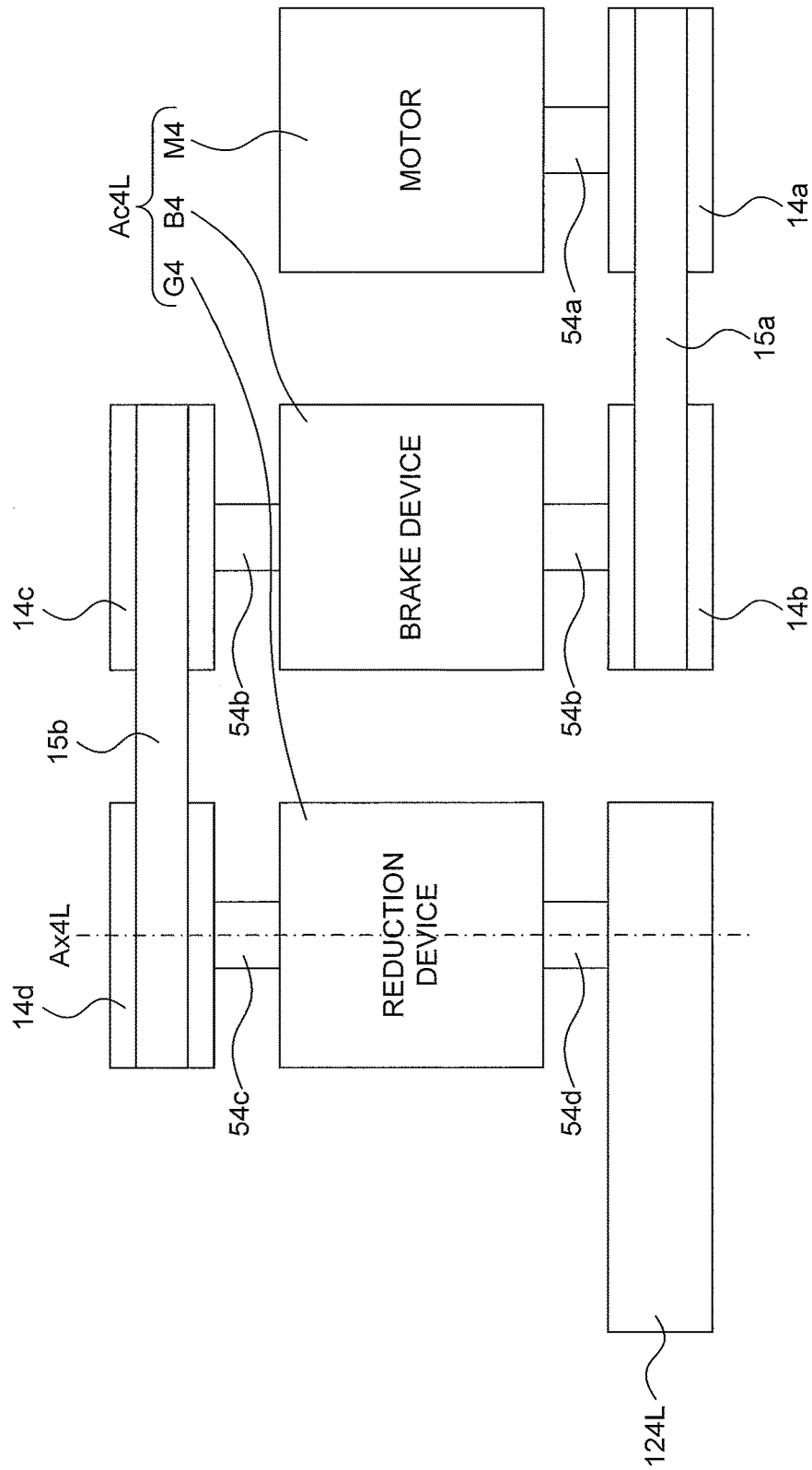
[FIG. 15]

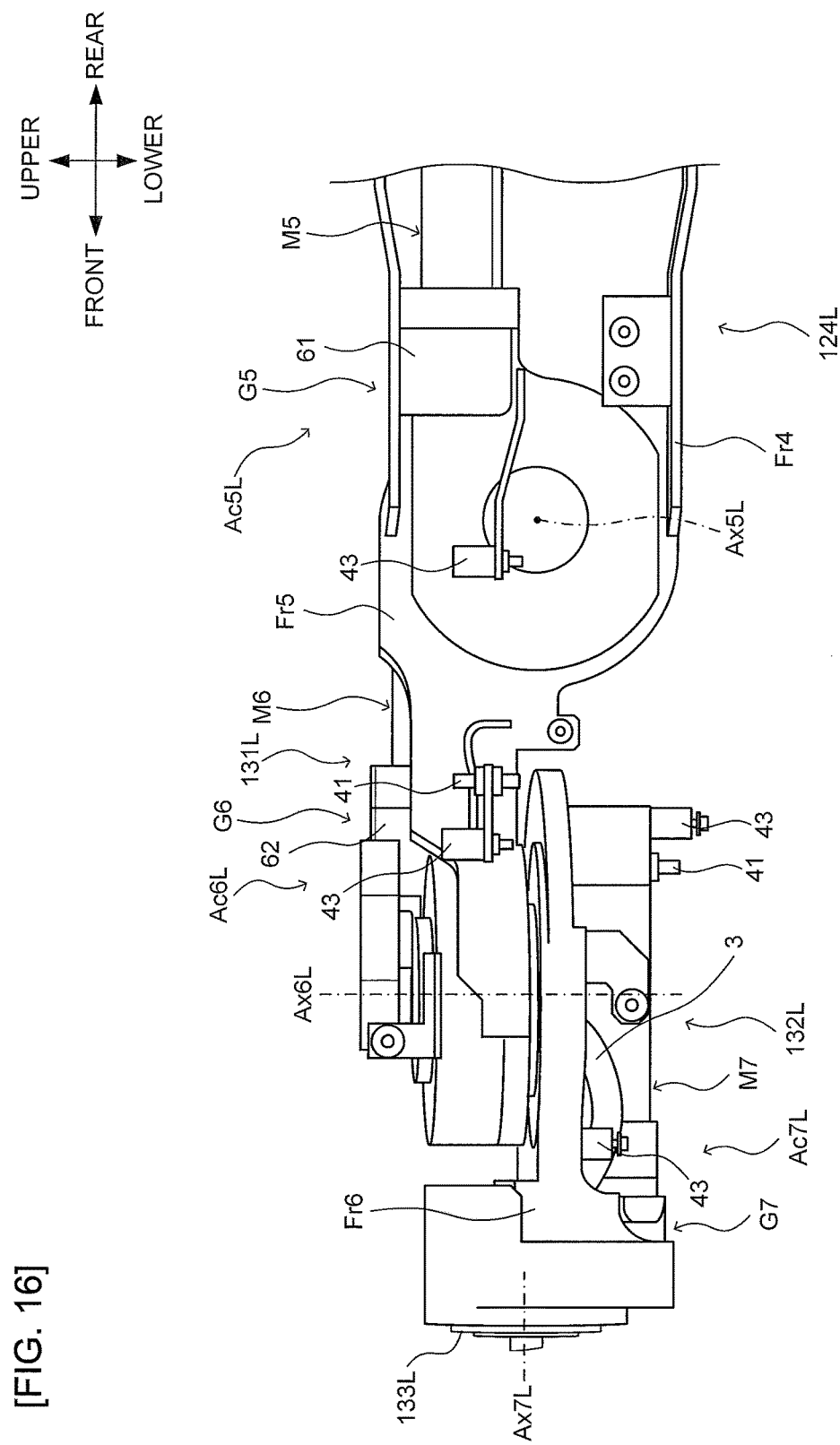

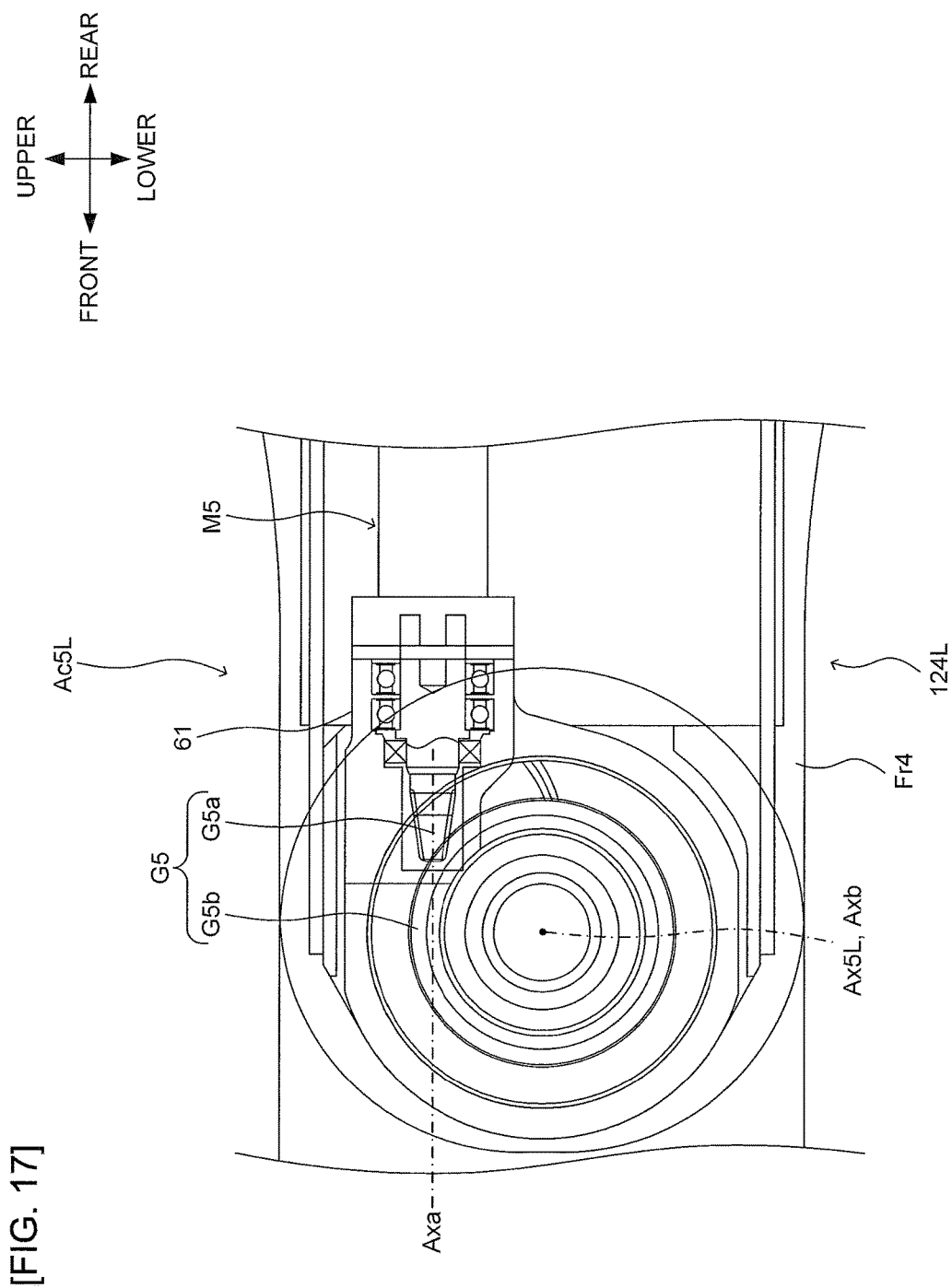

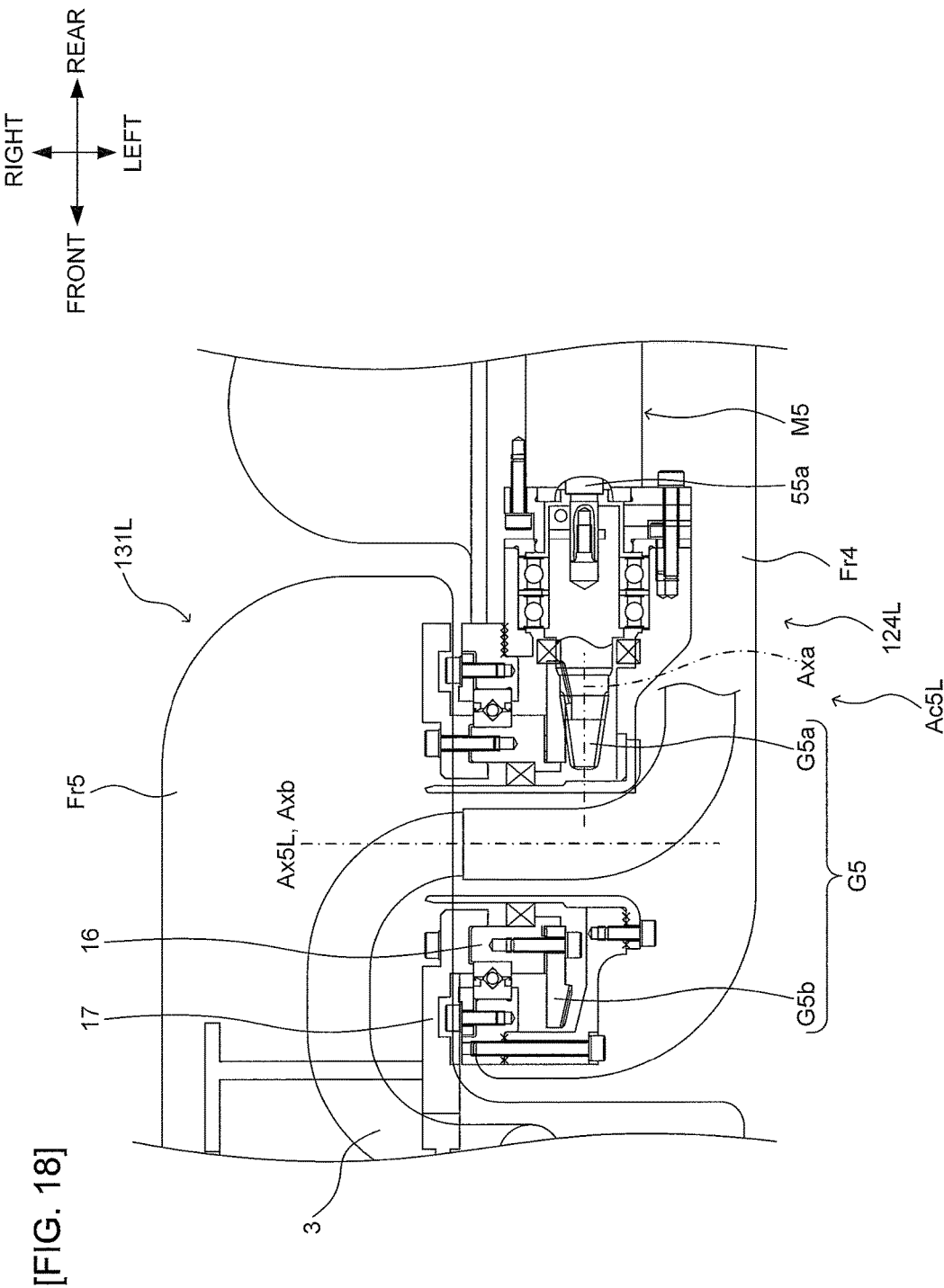
[FIG. 18]

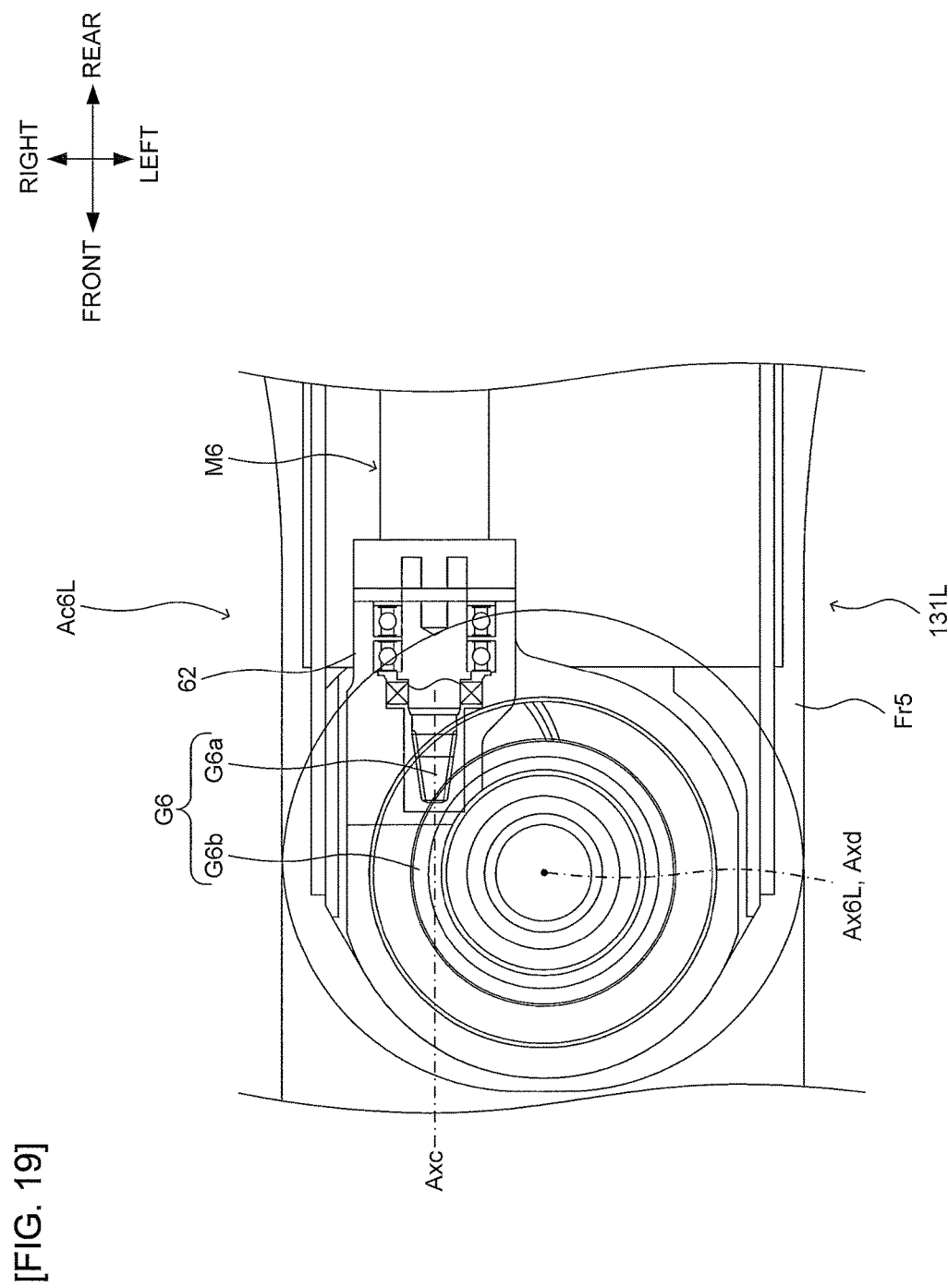

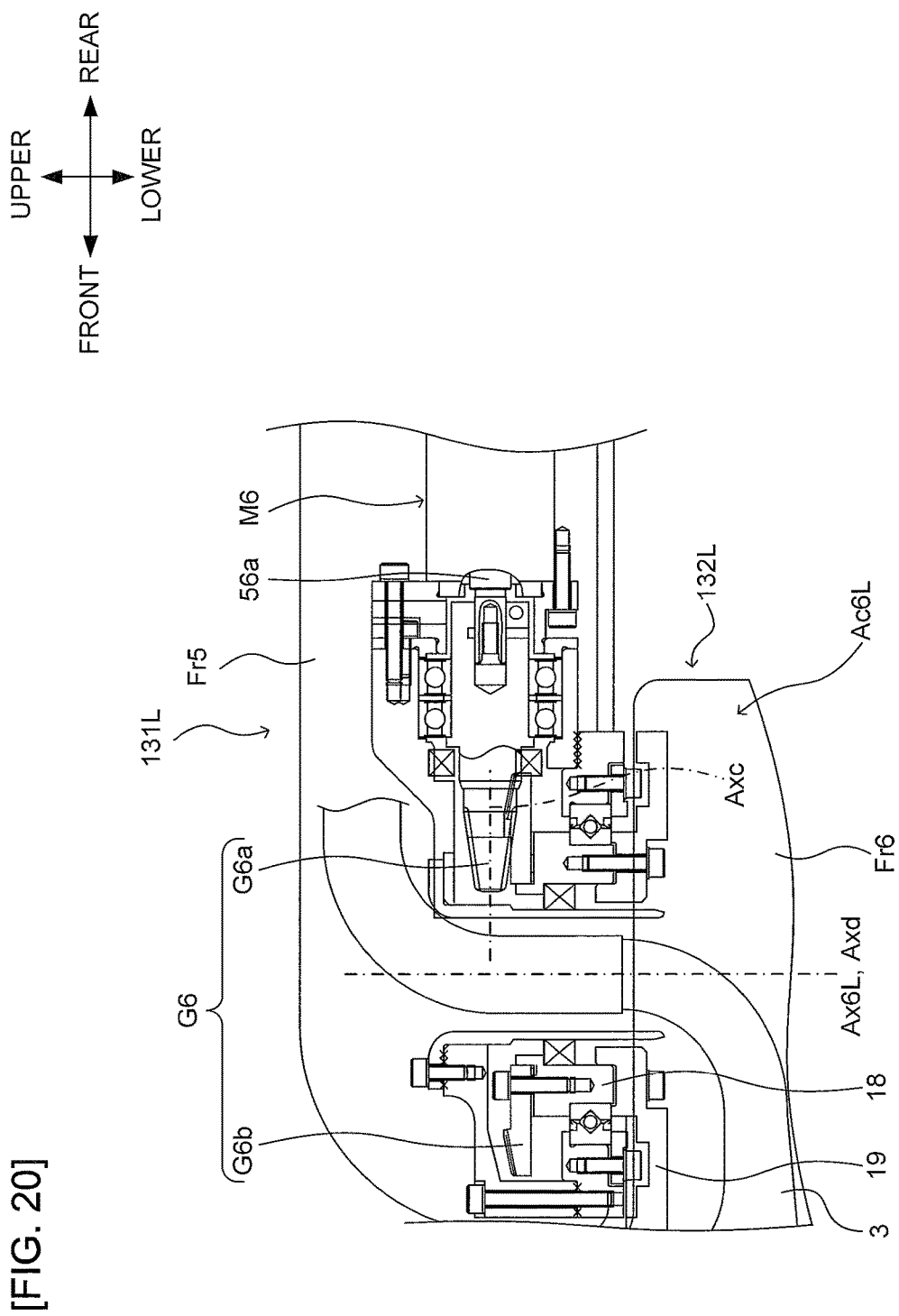
[FIG. 20]

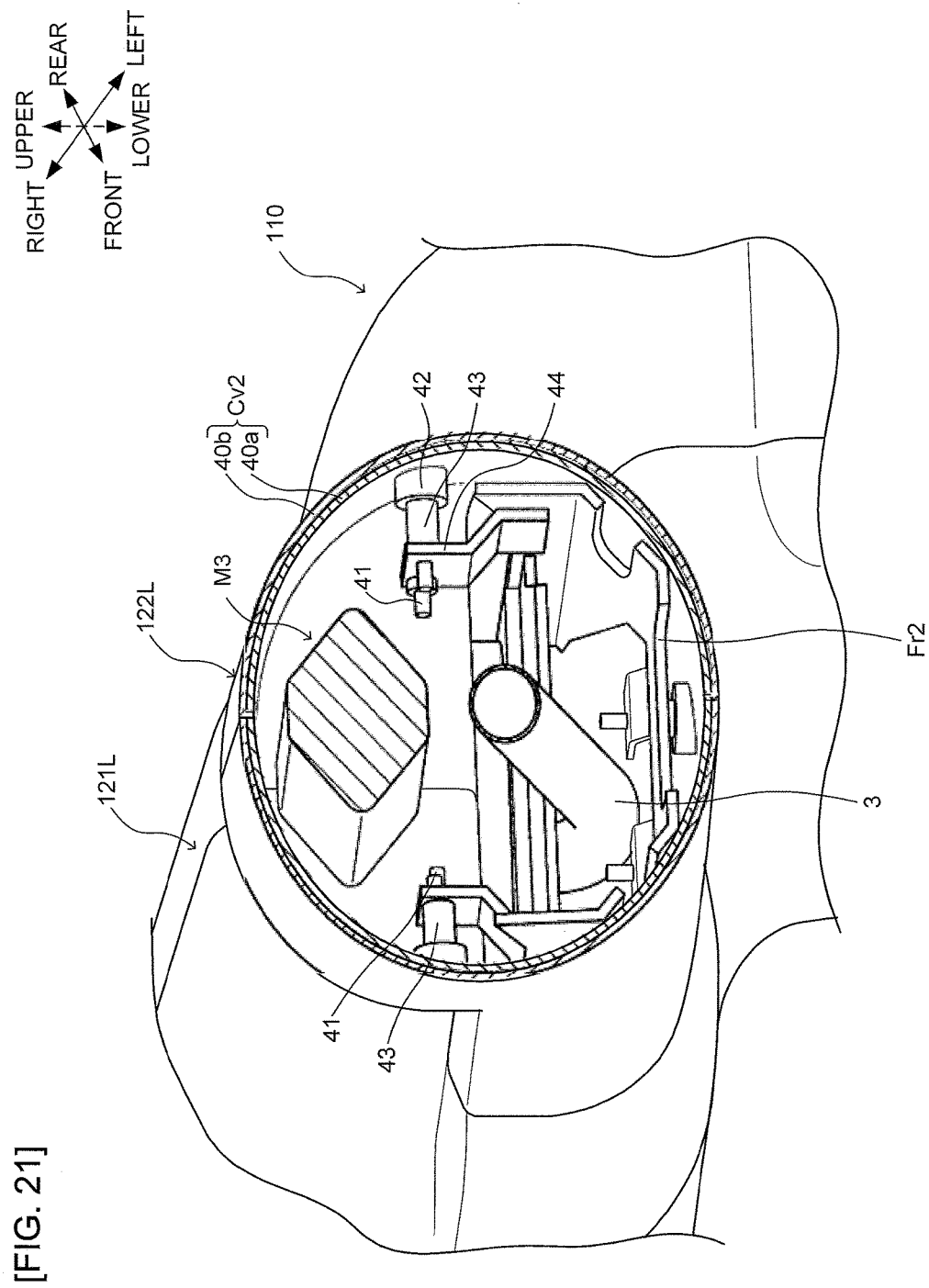
[FIG. 21]

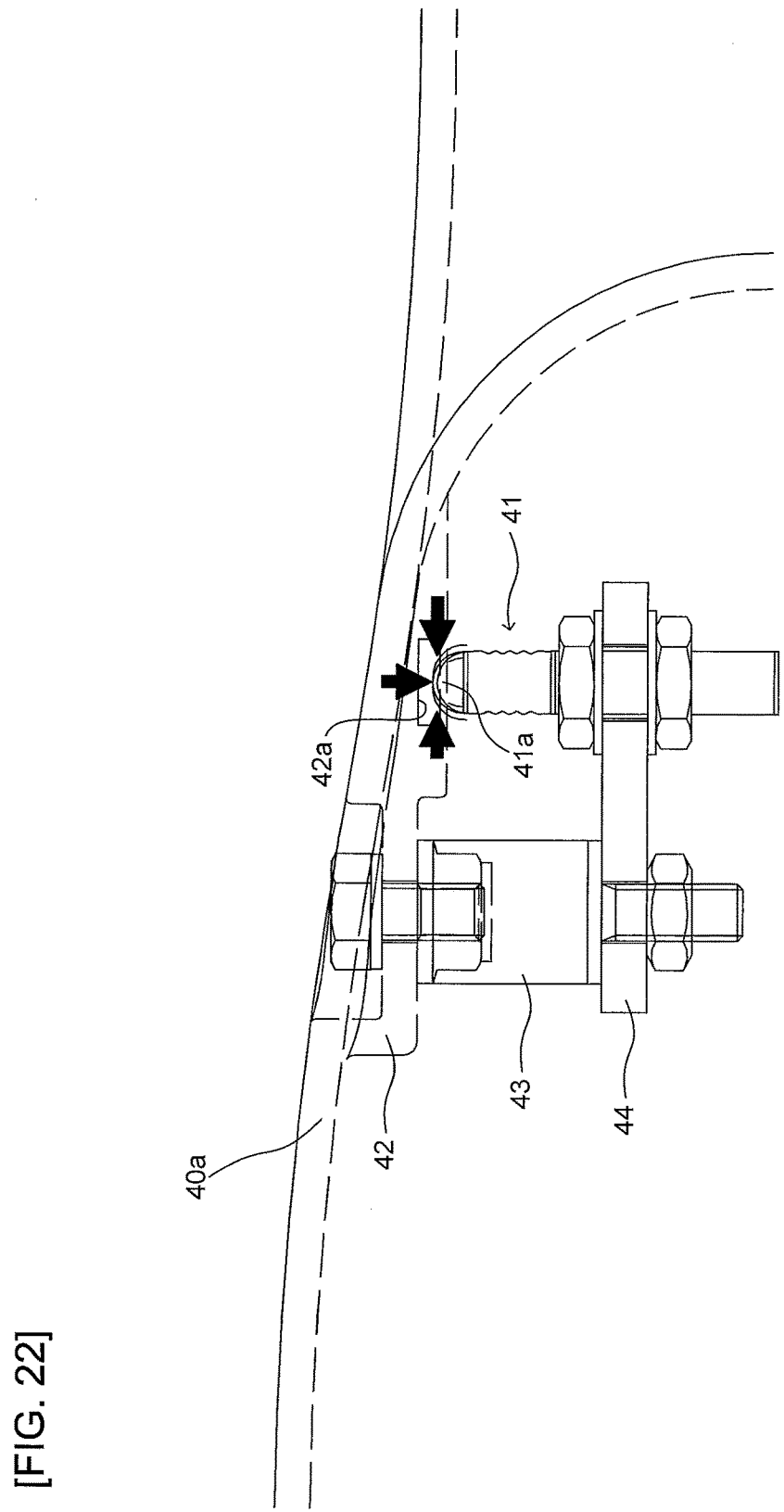
[FIG. 22]

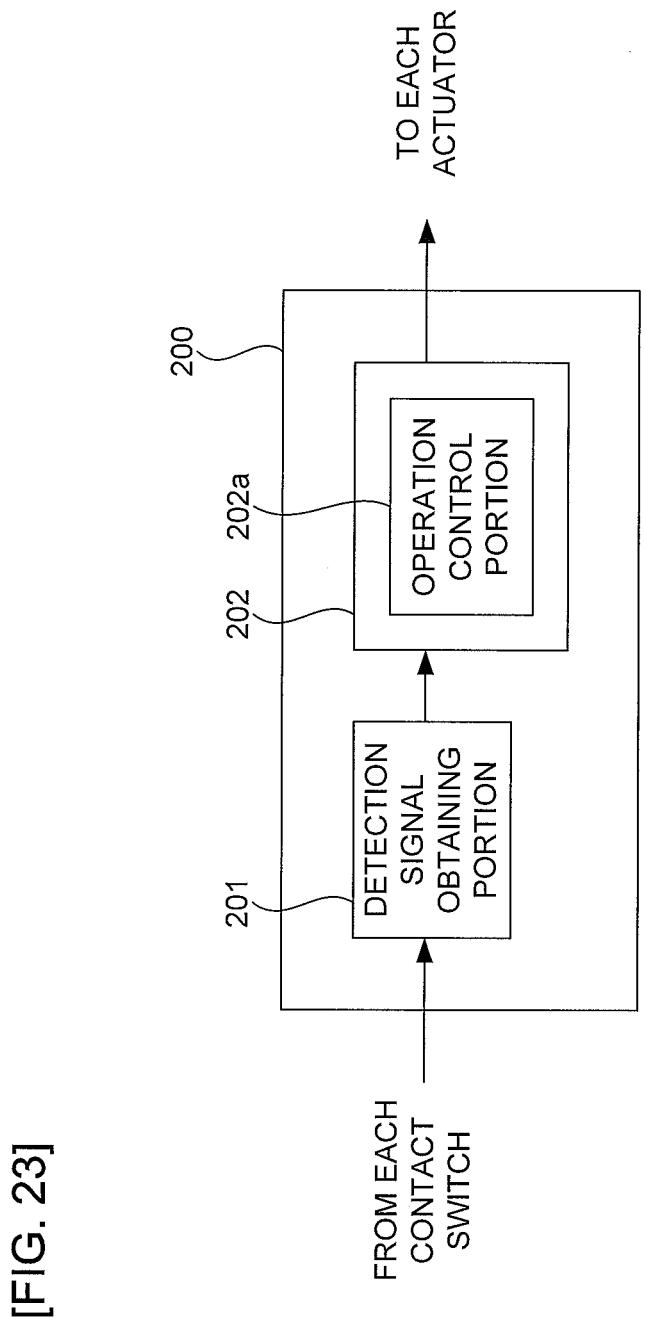

ROBOT

CROSS-REFERENCE TO RELATED APPLICATION

The present application claims priority from Japanese Patent Application No. 2012-253262 which was filed on Nov. 19, 2012, the disclosures of which are incorporated herein by reference in its entirety.

FIELD OF THE INVENTION

A disclosed embodiment relates to a robot.

DESCRIPTION OF THE RELATED ART

JP, A, 2010-94749 discloses a robot.

SUMMARY OF THE INVENTION

According to one aspect of the disclosure, there is provided a robot comprising a base and a robot main body. The base is installed at an installation spot of the robot. The robot main body is arranged on the base and includes a plurality of structural members driven by a plurality of actuators. The base includes a housing into which a control cable drawn from the plurality of actuators is introduced, a first opening portion provided on a lower surface of the housing, and a second opening portion provided on a side surface of the housing. The first opening portion is configured capable of selectively attaching/detaching either one of a first connector plate including a connector to which a tip end portion of the control cable can be attached and a first lid portion not including the connector. The second opening portion is configured capable of selectively attaching/detaching either one of a second connector plate including a connector to which a tip end portion of the control cable can be attached and a second lid portion not including the connector.

BRIEF DESCRIPTION OF THE DRAWING

FIG. 1 is a perspective view illustrating an entire configuration of a robot device of an embodiment and a robot provided therein.

FIG. 2 is a perspective view illustrating the entire configuration of the robot in a state in which a cover constituting an outer shell is omitted.

FIG. 3 is a rear view illustrating the entire configuration of the robot, indicating the cover constituting the outer shell by a broken line.

FIG. 4 is a bottom view illustrating the entire configuration of the robot in a state in which the cover constituting the outer shell is omitted.

FIG. 5 is a sectional view illustrating the lower end sides of a base and a torso portion.

FIG. 6A is an arrow view when seen from an arrow A direction in FIG. 5.

FIG. 6B is an arrow view when seen from an arrow B direction in FIG. 5.

FIG. 7 is a sectional view illustrating the lower end sides of the base and the torso portion.

FIG. 8A is an arrow view when seen from an arrow C direction in FIG. 7.

FIG. 8B is an arrow view when seen from an arrow D direction in FIG. 7.

FIG. 9 is a top view illustrating a shoulder portion, an upper arm A portion, and an upper arm B portion.

FIG. 10 is a side view illustrating the shoulder portion and the upper arm A portion.

FIG. 11 is a schematic diagram illustrating outline configurations of a motor, a brake device, and a reduction device provided on the shoulder portion.

FIG. 12 is a sectional view illustrating the upper arm A portion.

FIG. 13 is a top view illustrating the upper arm B portion.

FIG. 14 is a side view illustrating the upper arm B portion.

FIG. 15 is a schematic diagram illustrating outline configurations of the motor, the brake device, and the reduction device provided on the upper arm B portion.

FIG. 16 is a side view illustrating a lower arm portion and a wrist portion.

FIG. 17 is a sectional view for explaining an actuator provided on the lower arm portion.

FIG. 18 is a sectional view for explaining the actuator provided on the lower arm portion.

FIG. 19 is a sectional view for explaining the actuator provided on a wrist A portion.

FIG. 20 is a sectional view for explaining the actuator provided on the wrist A portion.

FIG. 21 is a sectional view by an XXI-XXI section in FIG. 1.

FIG. 22 is a sectional view for explaining a contact switch.

FIG. 23 is a block diagram illustrating a functional configuration of a robot controller.

DESCRIPTION OF THE EMBODIMENTS

An embodiment will be described below by referring to the attached drawings. If there are notes such as "front", "rear", "left", "right", "upper", and "lower" in the figure, the "front", "rear", "left", "right", "upper", and "lower" in explanation in the description indicate the directions noted.

<Robot Device>

First, an entire configuration of a robot device of the present embodiment will be described.

As illustrated in FIG. 1, a robot device 1 of the present embodiment has a robot 100 and a robot controller 200 (controller). The robot 100 and the robot controller 200 are connected to each other by a connection cable 2, capable of mutual communication. The robot 100 and the robot controller 200 may be connected via radio. Moreover, the robot controller 200 may be provided inside the robot 100.

<Robot>

As illustrated in FIGS. 1 to 4, the robot 100 has a base 101 and a robot main body 102. The base 101 is installed at an installation spot (on a floor portion, a seat or the like, for example) of the robot 100. The robot main body 102 is provided on an upper end portion of the base 101. This robot main body 102 is a so-called double-arm robot having a torso portion 110, two arm portions 120L and 120R attached to the torso portion 110, respectively, and two wrist portions 130L and 130R.

The torso portion 110 is rotatably connected to the upper end portion of the base 101. Specifically, the torso portion 110 is supported swingably around a swing axis line Ax0 substantially orthogonal to a fixed surface (not shown) of the base 101 on the upper end portion of the base 101. This torso portion 110 is driven to swing around the swing axis line Ax0 with respect to the upper end portion of the base 101 by driving of an actuator Ac0 provided on the base 101.

The arm portion 120L is connected rotatably to a tip end portion (hereinafter referred to as a "left end portion" as appropriate) on one side of the torso portion 110 (left side in a posture of the robot main body 102 illustrated in each figure). This arm portion 120L is provided with a multi joint structure (multi-axis structure) composed of a shoulder portion 121L, an upper arm A portion 122L, an upper arm B portion 123L, and a lower arm portion 124L.

The shoulder portion 121L is supported rotatably around a rotation axis line Ax1L substantially perpendicular to the swing axis line Ax0 on the left end portion of the torso portion 110. This shoulder portion 121L is driven to rotate around the rotation axis line Ax1L with respect to the left end portion of the torso portion 110 by driving of an actuator Ac1L provided on the torso portion 110.

The upper arm A portion 122L is supported swingably around a swing axis line Ax2L substantially perpendicular to the rotation axis line Ax1L on the tip end side of the shoulder portion 121L. This upper arm A portion 122L is driven to swing around the swing axis line Ax2L with respect to the tip end side of the shoulder portion 121L by driving of an actuator Ac2L provided on the shoulder portion 121L.

The upper arm B portion 123L is supported rotatably around a rotation axis line Ax3L substantially perpendicular to the swing axis line Ax2L on the tip end side of the upper arm A portion 122L. This upper arm B portion 123L is driven to rotate around the rotation axis line Ax3L with respect to the tip end side of the upper arm A portion 122L by driving of an actuator Ac3L provided on the upper arm A portion 122L.

The lower arm portion 124L is supported swingably around a swing axis line Ax4L substantially perpendicular to the rotation axis line Ax3L on the tip end side of the upper arm B portion 123L. This lower arm portion 124L is driven to swing around the swing axis line Ax4L with respect to the tip end side of the upper arm B portion 123L by driving of an actuator Ac4L provided on the upper arm B portion 123L.

The wrist portion 130L is connected rotatably with respect to a tip end portion (that is, the tip end side of the lower arm portion 124L) of the arm portion 120L. This wrist portion 130L is provided with a multi joint structure (multi-axis structure) composed of a wrist A portion 131L, a wrist B portion 132L, and a flange portion 133L.

The wrist A portion 131L is supported swingably around a swing axis line Ax5L substantially perpendicular to the swing axis line Ax4L on the tip end side of the lower arm portion 124L. This wrist A portion 131L is driven to swing around the swing axis line Ax5L with respect to the tip end side of the lower arm portion 124L by driving of an actuator Ac5L provided on the lower arm portion 124L.

The wrist B portion 132L is supported swingably around a swing axis line Ax6L substantially perpendicular to the longitudinal direction of the wrist portion 130L and substantially perpendicular to the swing axis line Ax5L on the tip end side of the wrist A portion 131L. This wrist B portion 132L is driven to swing around the swing axis line Ax6L with respect to the tip end side of the wrist A portion 131L by driving of an actuator Ac6L provided on the wrist A portion 131L.

The flange portion 133L is supported rotatably around a rotation axis line Ax7L substantially perpendicular to both of the swing axis line Ax5L and the swing axis line Ax6L on the tip end side of the wrist B portion 132L. This flange portion 133L is driven to rotate around a rotation axis line Ax7L with respect to the tip end side of the wrist B portion 132L by driving of an actuator Ac7L provided on the wrist B portion 132L. At this time, to a tip end portion of the flange portion 133L, various tools (not shown) for performing desired works for a work target (not shown) of the robot 100 are attached. A tool attached to the tip end portion of the flange portion 133L is driven to rotate around the rotation axis line Ax7L by rotation of the flange portion 133L around the rotation axis line Ax7L.

Here, rotation around a rotation axis along the longitudinal direction (or a material extending direction) of the arm portion 120L and the wrist portion 130L is called "rotation", and rotation around a rotation axis substantially perpendicular to the longitudinal direction is called "swing", and they are distinguished from each other.

Moreover, description such as "perpendicular" or "orthogonal" is not strict but a substantial tolerance/an error caused is allowed. Moreover, "perpendicular" or "orthogonal" does not mean intersection of virtual axes but a position of twist is also included as long as directions formed by virtual axes intersect each other.

On the other hand, the arm portion 120R is connected rotatably with respect to a tip end portion (hereinafter referred to as a "right end portion" as appropriate) on the other side (right side in the posture of the robot main body 102 illustrated in each figure) of the torso portion 110 and is provided with a multi joint structure (multi-axis structure) composed of a shoulder portion 121R, an upper arm A portion 122R, an upper arm B portion 123R, and a lower arm portion 124R.

The shoulder portion 121R is supported rotatably around a rotation axis line Ax1R substantially perpendicular to the rotation axis line Ax0 on the right end portion of the torso portion 110. This shoulder portion 121R is driven to rotate around the rotation axis line Ax1R with respect to the right end portion of the torso portion 110 by driving of an actuator Ac1R provided on the torso portion 110.

The upper arm A portion 122R is supported swingably around a swing axis line Ax2R substantially perpendicular to the rotation axis line Ax1R on the tip end side of the shoulder portion 121R. This upper arm A portion 122R is driven to swing around the swing axis line Ax2R with respect to the tip end side of the shoulder portion 121R by driving of an actuator Ac2R provided on the shoulder portion 121R.

The upper arm B portion 123R is supported rotatably around a rotation axis line Ax3R substantially perpendicular to the swing axis line Ax2R on the tip end side of the upper arm A portion 122R. This upper arm B portion 123R is driven to rotate around the rotation axis line Ax3R with respect to the tip end side of the upper arm A portion 122R by driving of an actuator Ac3R provided on the upper arm A portion 122R.

The lower arm portion 124R is supported swingably around a swing axis line Ax4R substantially perpendicular to the rotation axis line Ax3R on the tip end side of the upper arm B portion 123R. This lower arm portion 124R is driven to swing around a swing axis line Ax4R with respect to the tip end side of the upper arm B portion 123R by driving of an actuator Ac4R provided on the upper arm B portion 123R.

The wrist portion 130R is connected rotatably with respect to a tip end portion (that is, the tip end side of the lower aim portion 124R) of the arm portion 120R and is provided with a symmetrical structure with respect to the wrist portion 130L. That is, the wrist portion 130R is provided with a multi joint structure (multi-axis structure) composed of a wrist A portion 131R, a wrist B portion 132R, and a flange portion 133R.

The wrist A portion 131R is supported swingably around a swing axis line Ax5R substantially perpendicular to the swing axis line Ax4R on the tip end side of the lower arm portion 124R. This wrist A portion 131R is driven to swing around the swing axis line Ax5R with respect to the tip end side of the lower arm portion 124R by driving of an actuator Ac5R provided on the lower arm portion 124R.

The wrist B portion 132R is supported swingably around a swing axis line Ax6R substantially perpendicular to the longitudinal direction of the wrist portion 130R and substantially perpendicular to the swing axis line Ax5R on the tip end side of the wrist A portion 131R. This wrist B portion 132R is driven to swing around the swing axis line Ax6R with respect to the tip end side of the wrist A portion 131R by driving of an actuator Ac6R provided on the wrist A portion 131R.

The flange portion 133R is supported rotatably around a rotation axis line Ax7R substantially perpendicular to both of the swing axis line Ax5R and the swing axis line Ax6R on the tip end side of the wrist B portion 132R. This flange portion 133R is driven to rotate around the rotation axis line Ax7R with respect to the tip end side of the wrist B portion 132R by driving of an actuator Ac7R provided on the wrist B portion 132R. At this time, to a tip end portion of the flange portion 133R, various tools (not shown) for performing desired works for a work target of the robot 100 are attached. A tool attached to the tip end portion of the flange portion 133R is driven to rotate around the rotation axis line Ax7R by rotation of the flange portion 133R around the rotation axis line Ax7R.

The swing axis lines Ax5L and Ax5R link to first axis lines, respectively, and the wrist A portions 131L and 131R link to first wrist elements, respectively. Moreover, the swing axis lines Ax6L and Ax6R link to second axis lines, respectively, and the wrist B portions 132L and 132R link to second wrist elements, respectively. Moreover, the rotation axis lines Ax7L and Ax7R link to third axis lines, respectively, and the flange portions 133L and 133R link to third wrist elements, respectively.

Moreover, each of the shoulder portions 121L, 121R, the upper arm A portions 122L, 122R, the upper arm B portions 123L, 123R, the lower arm portions 124L, 124R, the wrist A portions 131L, 131R, the wrist B portions 132L, 132R, and the flange portions 133L and 133R links to the arm element. The wrist A portions 131L and 131R also link to means supported swingably around the first axis line orthogonal to the longitudinal direction of the wrist portion on the tip end portion of the arm portion. The wrist B portions 132L and 132R also link to means supported swingably around the second axis line orthogonal to the longitudinal direction of the wrist portion on the tip end side of the means supported swingably around the first axis line. The flange portions 133L and 133R also link to means supported rotatably around the third axis line as a final axis along the longitudinal direction of the wrist portion on the tip end side of the means supported swingably around the axis line.

Moreover, each of the torso portion 110, the shoulder portions 121L, 121R, the upper arm A portions 122L, 122R, the upper arm B portions 123L, 123R, the lower arm portions 124L, 124R, the wrist A portions 131L, 131R, the wrist B portions 132L, 132R, and the flange portions 133L and 133R links to a structural member.

Moreover, the arm portions 120L, 120R and the wrist portions 130L, 130R constitute an arm body. Moreover, each of the upper arm A portions 122L, 122R and the lower arm portions 124L, 124R links to a specific arm element.

Moreover, the robot controller 200 is composed of a computer having an arithmetic unit, a storage device, an input device and the like, for example. This robot controller 200 controls an entire operation of the robot main body 102. The robot controller 200 will be described later in more detail.

<Robot>

Subsequently, a detailed configuration of each portion of the robot 100 will be sequentially described.

<Base>

As illustrated in FIGS. 1 to 4, the base 101 has a substantially cylindrical housing 101a constituting an outer shell thereof. The housing 101a is formed of casting such as aluminum, for example.

Moreover, on the base 101, as described above, the actuator Ac0 swinging and driving the torso portion 110 around the swing axis line Ax0 is provided. The actuator Ac0 includes a motor M0 generating a rotation driving force for driving the torso portion 110, a brake device B0 (See FIGS. 5 and 7 which will be described later) for braking or holding rotation of the motor M0, and a reduction device G0 for reducing the speed of rotation of the motor M0 and transmitting it to the torso portion 110 and driving the torso portion 110. At this time, an axis (input shaft G0-1, an output shaft G0-2 and the like) of the reduction device G0 has a hollow structure, and a control cable 3 which will be described later is inserted through the inside thereof.

From the actuators Ac0, Ac1L-Ac7L and Ac1R-Ac7R (if they are indicated without distinction, they shall be referred to as the "actuator Ac" as appropriate in the following), the control cable 3 for controlling driving (power supply, signal transmission/reception and the like) of these actuators Ac0, Ac1L-Ac7L and Ac1R-Ac7R is drawn. The pulled out control cable 3 is routed around in each portion of the robot main body 102. In FIG. 2, the control cable 3 is not shown. The tip end side of the routed-around control cable 3 passes through the shaft of the reduction device G0 disposed on an upper end portion of the housing 101a and is finally introduced into the housing 101a. In the present embodiment, connection to the control cable 3 introduced into the housing 101a can be selectively made on either one of a lower end portion and a rear surface of the base 101 in accordance with an application or convenience for a user.

That is, in the housing 101a, an opening portion 10a (first opening portion) is provided on a lower surface thereof (See FIG. 4), and an opening portion 10b (second opening portion) is provided on its side surface (a rear surface in this example) (See FIG. 3). An opening portion may be provided on a side surface (a front surface, a left surface, a right surface or the like, for example) other than the rear surface of the housing 101a. To each of these opening portions 10a and 10b, either one of a connector plate provided with a connector to which a tip end portion 3a of the control cable 3 introduced into the housing 101a can be attached and a lid portion not provided with the connector can be selectively attached/detached. FIGS. 3 and 4 illustrate a state in which neither of the connector plate or the lid portion is attached to the opening portions 10a and 10b.

At this time, as illustrated in FIG. 3, a pipe P is disposed inside the shaft of the reduction device G0 disposed on the upper end portion of the housing 101a. The pipe P is introduced into the housing 101a while the tip end side of the routed control cable 3 is inserted inside the pipe P. Moreover, the pipe P supports the tip end side of the control cable 3 inside the housing 101a so that the tip end portion of the control cable 3 introduced into the housing 101a can be directed to any of the opening portions 10a and 10b. The tip end portion of the control cable 3 is supported by the pipe P as above, and thereby it is possible to perform both connection of the connector plate to the connector when the connector plate is attached to the opening portion 10a and connection of the connector plate to the connector when the connector plate is attached to the opening portion 10b. The housing 101a links to means for introducing inside the control cables drawn from the plurality of actuators. Moreover, the opening portion 10a links to means for selectively attaching/detaching either one of a first connector plate provided with the connector to which the tip end portion of the control cable can be attached and a first lid portion not provided with the connector. Moreover, the opening portion 10b links to means for selectively attaching/detaching either one of a second connector plate provided with the connector to which the tip end portion of the control cable can be attached and a second lid portion not provided with the connector.

FIGS. 5, 6A, and 6B illustrate a case in which the connector plate is attached to the opening portion 10a and the lid portion is attached to the opening portion 10b.

In the example illustrated in FIGS. 5, 6A, and 6B, a connector plate 11a (first connector plate) linked to the opening portion 10a is attached to the opening portion 10a, and the opening portion 10a is closed by this connector plate 11a. The connector plate 11a is provided with a connector group 13a including a connector to which the tip end portion of the control cable 3 can be attached. Moreover, the lid portion 12b (second lid portion) linked to the opening portion 10b is attached to the opening portion 10b, and the opening portion 10b is closed by this lid portion 12b. In this case, to a connection portion on the inner side of the housing 101a in the connector of the connector plate 11a, the tip end portion of the control cable 3 directed to the opening portion 10a (the lower end portion of the base 101) side while being supported by the pipe P is connected. On the other hand, to a connection portion on the outer side of the housing 101a in the connector of the connector plate 11a, the tip end portion of the connection cable from the outside of the housing 101a (the connection cable 2 from the robot controller 200 and the like, for example) is connected. Therefore, in this case, it is possible to execute connection to the control cable 3, that is, electric connection between the robot controller 2 and the like and the actuators Ac0, Ac1L-Ac7L, and Ac1R-Ac7R, for example, through the lower end portion of the base 101.

FIGS. 7, 8A, and 8B illustrate a case in which the lid portion is attached to the opening portion 10a and the connector plate is attached to the opening portion 10b.

In the example illustrated in FIGS. 7, 8A, and 8B, the lid portion 12a (first lid portion) linked to the opening portion 10a is attached to the opening portion 10a, and the opening portion 10a is closed by this lid portion 12a. Moreover, the connector plate 11b (second connector plate) linked to the opening portion 10b is attached to the opening portion 10b, and the opening portion 10b is closed by this connector plate 11b. The connector plate 11b is provided with a connector group 13b including a connector to which the tip end portion of the control cable 3 can be attached. In this case, to a connection portion on the inner side of the housing 101a in the connector of the connector plate 11b, the tip end portion of the control cable 3 directed to the opening portion 10b (rear surface of the base 101) side while being supported by the pipe P is connected. On the other hand, to a connection portion on the outer side of the housing 101a in the connector of the connector plate 11b, the tip end portion of the connection cable from the outside of the housing 101a (the connection cable 2 from the robot controller 200 and the like, for example) is connected. Therefore, in this case, it is possible to execute connection to the control cable 3, that is, electric connection between the robot controller 2 and the like and the actuators Ac0, Ac1L-Ac7L, and Ac1R-Ac7R, for example, through the rear surface of the base 101.

<Torso Portion>

As illustrated in FIGS. 1 to 4, the torso portion 110 has one or more strength members Fr0 and a cover Cv0 (details will be described later) covering the strength member Fr0 and constituting an outer shell of the torso portion 110. The strength member Fr0 is formed of a plate such as a high-tensile steel, for example. That is, the torso portion 110 is provided with an inner frame structure in which the strength member Fr0 covered by the cover Cv0 serves as a frame member constituting a support structure bearing strength of a gravity portion and a load portion during acceleration/deceleration. The structure of the torso portion 110 is not limited to such inner frame structure as in this example but may be constituted as an outer frame structure using a member forming an outer shell as a frame member.

<Shoulder Portion>

As illustrated in FIGS. 1 to 4, the shoulder portion 121L has one or more strength members Fr1 and a cover Cv1 (details will be described later) covering the strength member Fr1 and constituting an outer shell of the shoulder portion 121L. The strength member Fr1 is formed of a plate such as a high-tensile steel, for example. That is, the shoulder portion 121L is provided with an inner frame structure in which the strength member Fr1 covered by the cover Cv1 serves as a frame member constituting a support structure bearing strength of a gravity portion and a load portion during acceleration/deceleration. The structure of the shoulder portion 121L is not limited to such inner frame structure as in this example but may be constituted as an outer frame structure.

Moreover, on the shoulder portion 121L, as described above, the actuator Ac2L swinging and driving the upper arm A portion 122L around the swing axis line Ax2L is provided. As illustrated in FIGS. 9 to 11, the actuator Ac2L includes a motor M2, a brake device B2, and a reduction device G2 (joint portion) connecting the shoulder portion 121L and the upper arm A portion 122L so that they are movable with respect to each other.

The motor M2 generates a rotation driving force for driving the upper arm A portion 122L to the reduction device G2. A motor shaft 52a which is an output shaft of this motor M2 is arranged substantially in parallel with the swing axis line Ax2L. Moreover, on an end portion on one side in the first axial direction which will be described later in the motor shaft 52a, a pulley 6a (motor pulley) provided with a belt attaching portion is fixed so as to rotate together with the motor shaft 52a. A rotation center of the pulley 6a coincides with the rotation center of the motor shaft 52a.

The brake device B2 brakes or holds the rotation of the motor shaft 52a. A brake shaft 52b which is the shaft of this brake device B2 is arranged substantially in parallel (that is, substantially in parallel with the motor shaft 52a) with the swing axis line Ax2L. Moreover, on an end portion on one side in the axial direction (upper side in a posture of the robot main body 102 illustrated in each figure. Hereinafter referred to as "one side in a first axial direction" as appropriate) in the brake shaft 52b, a pulley 6b provided with two belt attaching portions (first brake pulley, second brake pulley) is fixed so as to rotate together with the brake shaft 52b. The rotation center of the pulley 6b coincides with the rotation center of the brake shaft 52b.

At this time, an endless (loop-shaped) belt 7a (first belt) is wound between a belt mounting portion of the pulley 6a on the motor M2 side and one of the belt attaching portions in the pulley 6b on the brake device B2 side. The motor shaft 52a and the brake shaft 52b are connected through the pulley 6a, the belt 7a, and the pulley 6b. Therefore, the rotation driving force of the motor shaft 52a is transmitted to the brake shaft 52b through the pulley 6a, the belt 7a, and the pulley 6b. The pulley 6a, the belt 7a, and the pulley 6b constitute a first transmission mechanism.

The reduction device G2 is disposed on the tip end portion of the shoulder portion 121L. An input shaft 52c of the reduction device G2 is arranged substantially along the swing axis line Ax2L (that is, substantially in parallel with the motor shaft 52a and the brake shaft 52b) and is supported rotatably with respect to the tip end portion of the shoulder portion 121L. An output shaft 52d of the reduction device G2 is connected to the input shaft 52c through an appropriate gear mechanism and is supported rotatably around the swing axis line Ax2L with respect to the tip end portion of the shoulder portion 121L. Moreover, on an end portion on one side in the first axial direction in the input shaft 52c, a pulley 6c (reduction device pulley) provided with a belt attaching portion is fixed so as to rotate together with the input shaft 52c. The rotation center of the pulley 6c coincides with the rotation center of the input shaft 52c.

At this time, an endless (loop-shaped) belt 7b (second belt) is wound between the other belt attaching portion of the pulley 6b on the brake device B2 side and the belt mounting portions in the pulley 6c on the reduction device G2 side. The brake shaft 52b and the input shaft 52c are connected through the pulley 6b, the belt 7b, and the pulley 6c. Therefore, the rotation driving force of the brake shaft 52b is transmitted to the input shaft 52c through the pulley 6b, the belt 7b, and the pulley 6c. The pulley 6b, the belt 7b, and the pulley 6c constitute a second transmission mechanism.

The reduction device G2 as above reduces the speed of rotation of the motor shaft 52a input through the input shaft 52c, transmits it to the upper arm A portion 122L through the output shaft 52d and drives the upper arm A portion 122L. At this time, the input shaft 52c and the output shaft 52d of the reduction device G2 are provided with a hollow structure, and the control cable 3 is inserted through the inside thereof. The motor shaft 52a and the input shaft 52c have dimensions in the axial direction larger than that of the brake shaft 52b.

The arm portion 120L and the wrist portion 130L as well as the arm portion 120R and the wrist portion 130R are constituted having the similar shape, respectively, and the shoulder portion 121L and the shoulder portion 121R are attached to the torso portion 110 so that rotation positions which become base points of the respective actuators Ac1L and Ac1R are different from each other by 180 degrees. As a result, the shaft configurations of the arm portion 120L and the wrist portion 130L as well as the arm portion 120R and the wrist portion 130R are symmetrical structures.

On the shoulder portion 121R, as described above, the actuator Ac2R swinging and driving the upper arm A portion 122R around the swing axis line Ax2R is provided. Regarding the actuator Ac2R, the upper arm A portion 122R which is its driving target has a structure similar to that of the upper arm A portion 122L which is a driving target of the actuator Ac2L and thus, description of the shoulder portion 121R and the actuator Ac2R will be omitted.

<Upper Arm A Portion>

As illustrated in FIGS. 1 to 4, the upper arm A portion 122L has one or more strength members Fr2 and a cover Cv2 (details will be described later) covering the strength member Fr2 and constituting an outer shell of the upper arm A portion 122L. The strength member Fr2 is formed of a plate such as a high-tensile steel, for example. That is, the upper arm A portion 122L is provided with an inner frame structure in which the strength member Fr2 covered by the cover Cv2 serves as a frame member constituting a support structure bearing strength of a gravity portion and a load portion during acceleration/deceleration. The structure of the upper arm A portion 122L is not limited to such inner frame structure as in this example but may be constituted as an outer frame structure.

Moreover, on the upper arm A portion 122L, as described above, the actuator Ac3L swinging and driving the upper arm B portion 123L around the rotation axis line Ax3L is provided. As illustrated in FIGS. 9, 10 and 12, the actuator Ac3L includes a motor M3 and a reduction device G3 (joint portion) connecting the upper arm A portion 122L and the upper arm B portion 123L so that they are movable with respect to each other.

The motor M3 generates a rotation driving force driving the upper arm B portion 123L to the reduction device G3. This motor M3 is a so-called motor with brake provided with a substantially cylindrical stator 8, a rotor 9, a motor shaft 53a which is an output shaft, a motor frame 10, and a brake portion 60. The rotor 9 is supported rotatably with respect to the stator 8 so as to face an outer peripheral surface of the stator 8 in a radial direction. The motor shaft 53a is arranged substantially in parallel with the rotation axis line Ax3L and is coupled to an inner peripheral surface of the rotor 9. The motor frame 10 is provided on the outer peripheral side of the stator 8 and constitutes an outer shell of the motor M3. This motor frame 10 links to means for connecting the outer shell of the motor to the arm element capable of transmitting stress and also connecting the motor to the arm element or the joint portion capable of transmitting stress. The brake portion 60 brakes or holds rotation of the motor shaft 53a. Though detailed explanation will be omitted, the motor M2 and motors M4-M7 which will be described later also have a configuration provided with a stator, a rotor, and a motor frame similar to the substantially cylindrical stator 8, the rotor 9, and the motor frame 10.

The reduction device G3 is fixed to the strength member Fr2 by a bolt, and the motor frame 10 is fixed to the reduction device G3 by a bolt. On the other hand, the motor frame 10 is connected also to a connecting member 11, capable of transmitting stress. In the present embodiment, the connecting member 11 is formed specifically of a bent steel plate, and configured such that one side is fixed to the strength member Fr2 by a bolt and the other side is in contact along an end portion of the motor frame 10 so that stress and heat are transmitted by the motor frame 10 and the connecting member 11. That is, the motor frame 10 forms a part of a strength member (frame assisting member) bearing strength of a gravity portion and a load portion during acceleration/deceleration of the robot 100 and a tool held by the robot 100 together with the strength member Fr2, the connecting member 11, and the reduction device G3. In FIG. 9, the connecting member 11 is not shown. That is, the motor frame 10 also serves as a frame assisting member of the upper arm A portion 122L in addition to the outer shell of the motor M3. At this time, by constituting the connecting member 11 by a member capable of transmitting heat, it is possible to transmit the heat generated by the motor M3 to the strength member Fr2 through the connecting member 11 (possible to dissipate the heat generated by the motor M3). Though detailed description will be omitted, also in the motor M2 and the motors M4-M7 which will be described later, the motor frame 10 also serves as the frame assisting member similar to the above.

The reduction device G3 is disposed on the tip end portion of the upper arm A portion 122L. The input shaft 53*b* of the reduction device G3 is fixed to the motor shaft 53*a* and supported rotatably with respect to the tip end portion of the upper arm A portion 122L. The output shaft 53*c* of the reduction device G3 is connected to the input shaft 53*b* through gears 12 and 13 and supported rotatably around the rotation axis line Ax3L with respect to the tip end portion of the upper arm A portion 122L. At this time, at least one of the gears 12 and 13 is formed of a resin such as thermosetting plastic or the like, for example. As a result, grease to the input shaft 53*b* and the output shaft 53*c* can be made unnecessary, and an oil seal can be omitted. At least one of the gears 12 and 13 may be formed of appropriate metal instead of a resin. Such reduction device G3 reduces the speed of rotation of the motor shaft 53*a* input through the input shaft 53*b*, transmits it to the upper arm B portion 123L through the output shaft 53*c* and drives the upper arm B portion 123L. At this time, the output shaft 53*c* is provided with a hollow structure, and the control cable 3 is inserted into the inside thereof.

On the upper arm A portion 122R, as described above, the actuator Ac3R swinging and driving the upper arm B portion 123R around the rotation axis line Ax3R is provided. Regarding the actuator Ac3R, the upper arm B portion 123R which is its driving target has a structure similar to that of the upper arm B portion 123L which is a driving target of the actuator Ac3L and thus, description of the upper arm A portion 122R and the actuator Ac3R will be omitted.

<Upper Arm B Portion>

As illustrated in FIGS. 1 to 4, the upper arm B portion 123L has one or more strength members Fr3 and a cover Cv3 (details will be described later) covering the strength member Fr3 and constituting an outer shell of the upper arm B portion 123L. The strength member Fr3 is formed of a plate such as a high-tensile steel, for example. That is, the upper arm B portion 123L is provided with an inner frame structure in which the strength member Fr3 covered by the cover Cv3 serves as a frame member constituting a support structure bearing strength of a gravity portion and a load portion during acceleration/deceleration. The structure of the upper arm B portion 123L is not limited to such inner frame structure as in this example but may be constituted as an outer frame structure.

Moreover, on the upper arm B portion 123L, as described above, the actuator Ac4L swinging and driving the lower arm portion 124L around the swing axis line Ax4L is provided. As illustrated in FIGS. 9 and 13 to 15, the actuator Ac4L includes a motor M4, a brake device B4, and a reduction device G4 (joint portion) connecting the upper arm B portion 123L and the lower arm portion 124L so that they are movable with respect to each other.

The motor M4 generates a rotation driving force for driving the lower arm portion 124L to the reduction device G4. A motor shaft 54*a* which is an output shaft of this motor M4 is arranged substantially in parallel with the swing axis line Ax4L. Moreover, on an end portion on one side in a second axial direction which will be described later in the motor shaft 54*a*, a pulley 14*a* (motor pulley) provided with a belt attaching portion is installed so as to rotate with the motor shaft 54*a*. The rotation center of the pulley 14*a* coincides with the rotation center of the motor shaft 54*a*. The motors M2 and M4 link to means provided with the motor shaft and generating a rotation driving force driving a specific arm element.

The brake device B4 brakes or holds rotation of the motor shaft 54*a*. A brake shaft 54*b* which is a shaft of this brake device B4 is arranged substantially in parallel with the swing axis line Ax4L (that is, substantially in parallel with the motor shaft 54*a*). Moreover, to an end portion on one side in the axial direction in the brake shaft 54*b* (upper side in the posture of the robot main body 102 illustrated in each figure. Hereinafter referred to as "one side in a second axial direction" as appropriate), a pulley 14*b* (first brake pulley) provided with a belt attaching portion is fixed so as to rotate together with the brake shaft 54*b*. The rotation center of the pulley 14*b* coincides with the rotation center of the brake shaft 54*b*. Moreover, to an end portion on the other side in the axial direction in the brake shaft 54*b* (lower side in the posture of the robot main body 102 illustrated in each figure. Hereinafter referred to as "the other side in second axial direction" as appropriate), a pulley 14*c* (second brake pulley) provided with a belt attaching portion is fixed so as to rotate together with the brake shaft 54*b*. The rotation center of the pulley 14*c* coincides with the rotation center of the brake shaft 54*b*. The brake devices B2 and B4 link to means provided with the brake shaft arranged in parallel with the motor shaft and making a brake force act.

At this time, an endless (loop-shaped) belt 15*a* (first belt) is wound between a belt mounting portion of the pulley 14*a* on the motor M4 side and the belt attaching portion in the pulley 14*b* on this brake device B4 side. The motor shaft 54*a* and the brake shaft 54*b* are connected through the pulley 14*a*, the belt 15*a*, and the pulley 14*b*. Therefore, the rotation driving force of the motor shaft 54*a* is transmitted to the brake shaft 54*b* through the pulley 14*a*, the belt 15*a*, and the pulley 14*b*. The pulley 14*a*, the belt 15*a*, and the pulley 14*b* constitute a first transmission mechanism and link to means for transmitting a driving force between the first brake pulley provided on the brake shaft and the motor pulley provided on the motor shaft.

The reduction device G4 is disposed on the tip end portion of the upper arm B portion 123L. An input shaft 54*c* of the reduction device G4 is arranged substantially along the swing axis line Ax4L (that is, substantially in parallel with the motor shaft 54*a* and the brake shaft 54*b*) and is supported rotatably with respect to the tip end portion of the upper arm B portion 123L. An output shaft 54*d* of the reduction device G4 is connected to the input shaft 54*c* through an appropriate gear mechanism and is supported rotatably around the swing axis line Ax4L with respect to the tip end portion of the upper aim B portion 123L. Moreover, to an end portion on the other side in the second axial direction in the input shaft 54*c*, a pulley 14*d* (reduction device pulley) provided with a belt attaching portion is fixed so as to rotate together with the input shaft 54*c*. The rotation center of a pulley 6*d* coincides with the rotation center of the input shaft 54*c*.

At this time, an endless (loop-shaped) belt 15*b* (second belt) is wound between a belt attaching portion of the pulley 14*c* on the brake device B4 side and the belt mounting portion in the pulley 14*d* on this reduction device G4 side. The brake shaft 54*b* and the input shaft 54*c* are connected through the pulley 14*c*, the belt 15*b*, and the pulley 14*d*. Therefore, the rotation driving force of the brake shaft 54*b* is transmitted to the input shaft 54*c* through the pulley 14*c*, the belt 15*b*, and the pulley 14*d*. The pulley 14*c*, the belt 15*b*, and the pulley 14*d* constitute a second transmission mechanism and link to means for transmitting a driving force between the second brake pulley provided on the brake shaft and the reduction device pulley provided on the input shaft of the means for transmitting it to the specific arm element.

The reduction device G4 as above reduces the speed of rotation of the motor shaft 54*a* input through the input shaft 54*c*, transmits it to the lower arm portion 124L through the output shaft 54*d* and drives the lower arm portion 124L. At this time, the input shaft 54*c* and the output shaft 54*d* of the reduction device G4 are provided with a hollow structure, and the control cable 3 is inserted through the inside thereof. The motor shaft 54*a* and the input shaft 54*c* have dimensions in the axial direction larger than that of the brake shaft 54*b*. The reduction devices G2 and G4 link to means for reducing the speed of rotation of the motor shaft input through the input shaft and transmitting it to the specific arm element.

On the upper arm B portion 123R, as described above, the actuator Ac4R swinging and driving the lower arm portion 124R around the swing axis line Ax4R is provided. Regarding the actuator Ac4R, the lower arm portion 124R which is its driving target has a structure similar to that of the lower arm portion 124L which is a driving target of the actuator Ac4L and thus, description of the upper arm B portion 123R and the actuator Ac4R will be omitted.

<Lower Arm Portion>

As illustrated in FIGS. 1 to 4, the lower arm portion 124L has one or more strength members Fr4 and a cover Cv4 (details will be described later) covering the strength member Fr4 and constituting an outer shell of the lower arm portion 124L. The strength member Fr4 is formed of a plate such as a high-tensile steel, for example. That is, the lower arm portion 124L is provided with an inner frame structure in which the strength member Fr4 covered by the cover Cv4 serves as a frame member constituting a support structure bearing strength of a gravity portion and a load portion during acceleration/deceleration. The structure of the lower arm portion 124L is not limited to such inner frame structure as in this example but may be constituted as an outer frame structure.

Moreover, on the lower arm portion 124L, as described above, the actuator Ac5L swinging and driving the wrist A portion 131L around the swing axis line Ax5L is provided. As illustrated in FIGS. 16 to 18, the actuator Ac5L includes a motor M5 (first driving motor) and a Hypoid (registered trademark) gear set G5 (first bevel gear set, joint portion) which is a type of a bevel gear set composed of two bevel gears and connects the upper arm B portion 123L and the wrist A portion 131L so that they are movable with respect to each other. The Hypoid gear set G5 is covered by a gear case 61.

The motor M5 generates a rotation driving force for driving the wrist A portion 131L to the Hypoid gear set G5. A motor shaft 55*a* which is an output shaft of this motor M5 is arranged substantially along the longitudinal direction of the arm portion 120L.

The Hypoid gear set G5 is to reduce a rotation speed of the motor M5 at a predetermined reduction ratio and, unlike a normal bevel gear set composed of two bevel gears whose axis lines intersect each other, it is composed of a pinion gear G5*a* and a ring gear G5*b* whose axis lines are shifted from each other. This Hypoid gear set G5 links to means for reducing the rotation speed of the first driving motor driving the first wrist element at a predetermined reduction ratio. The pinion gear G5*a* is connected to the motor shaft 55*a* so that its axis line Axa substantially extends along the longitudinal direction of the arm portion 120L and is supported rotatably with respect to the tip end portion of the lower arm portion 124L. This pinion gear G5*a* rotates around the axis line Axa with respect to the tip end portion of the lower arm portion 124L upon input of the rotation driving force from the motor G5 through the motor shaft 55*a*. The ring gear G5*b* is meshed with the pinion gear G5*a* so that its axis line Axb is substantially orthogonal to the longitudinal direction of the arm portion 120L (in other words, substantially orthogonal to the axis line Axa of the pinion gear G5*a*) and is supported rotatably around the swing axis line Ax5L with respect to the tip end portion of the lower arm portion 124L. The axis line Axb of the ring gear G5*b* coincides with the swing axis line Ax5L. At this time, the ring gear G5*b* is meshed with the tip end side of the pinion gear G5*a* in a state the tip end side of the pinion gear G5*a* is offset from the axis line Axb in a direction substantially orthogonal to the axis line Axb. This ring gear G5*b* reduces the speed of rotation of the motor shaft 55*a* input through the pinion gear G5*a*, transmits it to the wrist A portion 131L through gears 16 and 17 and drives the wrist A portion 131L. At this time, the gears 16 and 17 are provided with a hollow structure, and the control cable 3 is inserted through the inside thereof.

On the lower arm portion 124R, as described above, the actuator AcSR swinging and driving the wrist A portion 131R around the swing axis line AxSR is provided. Regarding the actuator Ac5R, the wrist A portion 131R which is its driving target has a structure similar to that of the wrist A portion 131L which is a driving target of the actuator AcSL and thus, description of the lower arm portion 124S and the actuator AcSR will be omitted.

<Wrist A Portion>

As illustrated in FIGS. 1 to 4, the wrist A portion 131L has one or more strength members Fr5 and a cover Cv5 (details will be described later) covering the strength member Fr5 and constituting an outer shell of the wrist A portion 131L. The strength member Fr5 is formed of a plate such as a high-tensile steel, for example. That is, the wrist A portion 131L is provided with an inner frame structure in which the strength member Fr5 covered by the cover Cv5 serves as a frame member constituting a support structure bearing strength of a gravity portion and a load portion during acceleration/deceleration. The structure of the wrist A portion 131L is not limited to such inner frame structure as in this example but may be constituted as an outer frame structure.

Moreover, on the wrist A portion 131L, as described above, the actuator Ac6L swinging and driving the wrist B portion 132L around the swing axis line Ax6L is provided. As illustrated in FIGS. 16, 19, and 20, the actuator Ac6L includes a motor M6 (second driving motor) and a Hypoid gear set G6 (second bevel gear set, joint portion) which is a type of a bevel gear set composed of two bevel gears and connects the wrist A portion 131L and the wrist B portion 132L so that they are movable with respect to each other. The Hypoid gear set G6 is covered by a gear case 62.

The motor M6 generates a rotation driving force for driving the wrist B portion 132L to the Hypoid gear set G6. A motor shaft 56*a* which is an output shaft of this motor M6 is arranged substantially along the longitudinal direction of the wrist A portion 131L.

The Hypoid gear set G6 is to reduce a rotation speed of the motor M6 at a predetermined reduction ratio and, unlike a normal bevel gear set composed of two bevel gears whose axis lines intersect each other, it is composed of a pinion gear G6*a* and a ring gear G6*b* whose axis lines are shifted from each other. This Hypoid gear set G6 links to means for reducing the rotation speed of the second driving motor driving the second wrist element at a predetermined reduction ratio. The pinion gear G6*a* is connected to the motor shaft 56*a* so that its axis line Axe substantially extends along the longitudinal direction of the wrist A portion 131L and is supported rotatably with respect to the tip end portion of the wrist A portion 131L. This pinion gear G6*a* rotates around the axis line Axe with respect to the tip end portion of the wrist A portion 131L upon input of the rotation driving force from the motor G6 through the motor shaft 56a. The ring gear G6b is meshed with the pinion gear G6a so that its axis line Axd is substantially orthogonal to the longitudinal direction of the wrist A portion 131L (in other words, substantially orthogonal to the axis line Axc of the pinion gear G6a) and is supported rotatably around the swing axis line Ax6L with respect to the tip end portion of the wrist A portion 131L. The axis line Axd of the ring gear G6b coincides with the swing axis line Ax6L. At this time, the ring gear G6b is meshed with the tip end side of the pinion gear G6a in a state the tip end side of the pinion gear G6a is offset from the axis line Axd in a direction substantially orthogonal to the axis line Axd. This ring gear G6b reduces the speed of rotation of the motor shaft 56a input through the pinion gear G6a, transmits it to the wrist B portion 132L through gears 18 and 19 and drives the wrist B portion 132L. At this time, the gears 18 and 19 are provided with a hollow structure, and the control cable 3 is inserted through the inside thereof.

On the wrist A portion 131R, as described above, the actuator Ac6R swinging and driving the wrist B portion 132R around the swing axis line Ax6R is provided. Regarding the actuator Ac6R, the wrist B portion 132R which is its driving target has a structure similar to that of the wrist B portion 132L which is a driving target of the actuator Ac6L and thus, description of the wrist A portion 131R and the actuator Ac6R will be omitted.

<Wrist B Portion>

As illustrated in FIGS. 1 to 4, the wrist B portion 132L has one or more strength members Fr6 and a cover Cv6 (details will be described later) covering the strength member Fr6 and constituting an outer shell of the wrist B portion 132L. The strength member Fr6 is formed of a plate such as a high-tensile steel, for example. That is, the wrist B portion 132L is provided with an inner frame structure in which the strength member Fr6 covered by the cover Cv6 serves as a frame member constituting a support structure bearing strength of a gravity portion and a load portion during acceleration/deceleration. The structure of the wrist B portion 132L is not limited to such inner frame structure as in this example but may be constituted as an outer frame structure.

Moreover, on the wrist B portion 132L, as described above, the actuator Ac7L swinging and driving the flange portion 133L around the rotation axis line Ax7L is provided. As illustrated in FIG. 16, the actuator Ac7L includes a motor M7 and a reduction device G7 (joint portion) connecting the wrist B portion 132L and the flange portion 133L so that they are movable with respect to each other. The motor M7 generates a rotation driving force for driving the flange portion 133L to the reduction device G7 through the motor shaft (not shown). The reduction device G7 reduces the speed of rotation by the motor M7, transmits it to the flange portion 133L and drives the flange portion 133L. At this time, at least one of the gears of a gear mechanism provided in the reduction device G7 is formed of a resin such as thermosetting plastic, for example. As a result, grease to shafts of the reduction device G7 (input shaft, output shaft and the like) can be made unnecessary, and an oil seal can be omitted. At least one of the gears of the gear mechanism provided in the reduction device G7 may be formed of appropriate metal instead of a resin. Moreover, at this time, the shafts of the reduction device G7 are provided with a hollow structure, and the control cable 3 is inserted through the inside thereof.

On the wrist B portion 132R, as described above, the actuator Ac7R swinging and driving the flange portion 133B around the rotation axis line Ax7R is provided. Regarding the actuator Ac7R, the flange portion 133R which is its driving target has a structure similar to that of the flange portion 133L which is a driving target of the actuator Ac7L and thus, description of the wrist B portion 132R and the actuator Ac7R will be omitted.

<Cover>

Subsequently, the covers Cv0-Cv6 will be described. In the following, the torso portion 110, the shoulder portions 121L, 121R, the upper arm A portions 122L, 122R, the upper arm B portions 123L, 123R, the lower arm portions 124L, 124R, the wrist A portions 131L, 131R, and the wrist B portions 132L, 132R, each provided with the inner frame structure in the robot main body 102 are collectively called "each portion provided with inner frame structure" as appropriate. Moreover, when the strength members Fr0-Fr6 provided in each of the portions provided with the inner frame structure in the robot main body 102 are referred to without distinction, they are called "strength member Fr" as appropriate. Moreover, when the covers Cv0-Cv6 provided in each of the portions provided with the inner frame structure in the robot main body 102 are referred to without distinction, they are called "cover Cv" as appropriate.

That is, the portions, each provided with the inner frame structure in the robot main body 102, have the covers Cv0-Cv6 covering each of the strength members Fr0-Fr6 and constituting the outer shell of each of the portions, respectively, as described above. The covers Cv0-Cv6 have shapes different from each other in order to comply with the shapes of the strength members Fr to be covered but have the equal composition. The cover Cv2 of the upper arm A portion 122L in the covers Cv0-Cv6 will be described below by referring to FIG. 21.

As illustrated in FIG. 21, the cover Cv2 of the upper arm A portion 122L is provided with a two-layer lamination structure. That is, the cover Cv2 of the upper arm A portion 122L is composed of a resin layer 40a which is an inner layer and an elastic outer skin 40b which is an outer layer. The resin layer 40a is formed of a resin such as ABS (Acrylonitrile Butadiene Styrene) resin and polycarbonate resin, for example, and covers the strength member Fr2. The elastic outer skin 40b is formed of an elastic body such as silicon rubber, for example, and bonded to the surface of the resin layer 40a so as to form the surface outer skin of the upper arm A portion 122L.

The cover Cv2 of the upper arm A portion 122L is described here, but, other than the cover Cv2, the cover Cv0 of the torso portion 110, the cover Cv1 of the shoulder portions 121L and 121R, the cover Cv2 of the upper arm A portion 122R, the cover Cv3 of the upper arm B portions 123L and 123R, the cover Cv4 of the lower arm portions 124L and 124R, the cover Cv5 of the wrist A portions 131L and 131R, and the cover Cv6 of the wrist B portions 132L and 132R are also provided with the two-layer lamination structure of the resin layer 40a which is an inner layer and the elastic outer skin 40b which is an outer layer. The elastic outer skin 40b links to means for forming the surface outer skin of the arm element while covering the frame member.

<Contact Switch>

Moreover, at least one of the upper aim A portion 122L, the upper arm B portion 123L, the lower arm portion 124L, the wrist A portion 131L, and the wrist B portion 132L and at least one of the upper arm A portion 122R, the upper arm B portion 123R, the lower arm portion 124R, the wrist A portion 131R, and the wrist B portion 132R are provided with a contact switch 41 (sensor. See FIG. 22 and the like which will be described later) for detecting contact, from the outside in three directions orthogonal to each other, with the elastic outer skin 40b. In the following, description will be made assuming that each of the portions is provided with the contact switch 41. Moreover, in the following, the contact switch 41 provided in the upper arm A portion 122L in each of the portions will be described by referring to FIGS. 21 and 22.

As illustrated in FIGS. 21 and 22, the contact switch 41 provided in the upper arm A portion 122L is installed upright with respect to a plate 44 connected to the strength member Fr2 of the upper arm A portion 122L so that a detection portion 41a on the tip end side of the contact switch 41 is accommodated in a recess portion 42a provided in a thick portion 42 of the resin layer 40a. At this time, an appropriate gap is formed between the detection portion 41a and the resin layer 40a in the periphery thereof so that the detection portion 41a of the contact switch 41 is not brought into contact with the resin layer 40a in the periphery thereof.

Moreover, in the vicinity of the contact switch 41 in the plate 44, a substantially columnar elastic member 43 formed of an appropriate elastic body (rubber and the like, for example) is installed upright so that the tip end portion thereof is in close contact with the thick portion 42 of the resin layer 40a.

Therefore, if an article or a human body is brought into contact with the elastic outer skin 40b of the upper arm A portion 122L (or the elastic outer skin 40b of another portion) and a load (compression force) is applied to the elastic outer skin 40b, the impact moves the resin layer 40a and the elastic member 43. At this time, if the resin layer 40a is brought into contact with the detection portion 41a, the contact switch 41 detects the contact, from the outside, with the elastic outer skin 40b and outputs a detection signal indicating that to the robot controller 200.

The contact switch 41 provided in the upper aim A portion 122L is described here, but the same applies to the contact switch 41 provided on each of the shoulder portions 121L, 121R, the upper arm A portion 122R, the upper arm B portions 123L, 123R, the lower arm portions 124L, 124R, the wrist A portions 131L, 131R, and the wrist B portions 132L, 132R, and the explanation will be omitted. The strength members Fr1-Fr6 link to means constituting the support structure at least for the gravity.

<Robot Controller>

Subsequently, a functional configuration of the robot controller 200 will be described.

As illustrated in FIG. 23, the robot controller 200 has a detection signal obtaining portion 201 and a robot control portion 202. The robot controller 200 links to means for controlling operations of a plurality of actuators.

The detection signal obtaining portion 201 obtains detection signals output from the contact switches 41 of the shoulder portions 121L, 121R, the upper arm A portions 122L, 122R, the upper arm B portions 123L, 123R, the lower arm portions 124L, 124R, the wrist A portions 131L, 131R, and the wrist B portions 132L, 132R.

The robot control portion 202 controls an entire operation of the robot main body 102 by controlling an operation of each of the actuators Ac0, Ac1L-Ac7L, Ac1R-Ac7R. This robot control portion 202 is provided with an operation control portion 202a.

When the detection signal obtaining portion 201 obtains a detection signal, the operation control portion 202a stops an operation of each actuator (or all the actuators Ac0, Ac1L-Ac7L, Ac1R-Ac7R) driving each portion of the robot main body 102 in which the contact switch 41 which outputted the detection signal is provided. Alternatively, the operation control portion 202a may reduce an operation speed of each actuator (or all the actuators Ac0, Ac1L-Ac7L, Ac1R-Ac7R) driving each portion of the robot main body 102 to a predetermined speed (a safe speed even if an article or a human body is brought into contact, for example, or in other words, a speed substantially stopped) or less.

As described above, in the present embodiment, the opening portion 10a is provided in the lower surface of the housing 101a in the base 101, and the opening portion 10b is similarly provided in the rear surface of the housing 101a. To the opening portion 10a, either one of the connector plate 11a and the lid portion 12a can be selectively attached. To the opening portion 10b, either one of the connector plate 11b and the lid portion 12b can be selectively attached. As a result, electric connection between the robot controller 200 and the like and the actuators Ac0, Ac1L-Ac7L, and Ac1R-Ac7R can be executed either on the lower end portion of the base 101 or on the rear surface of the base 101 in accordance with an application or convenience for the user. As a result, convenience for the user can be improved, and as compared with manufacture of the separate bases 101 in conformance with each, a manufacturing cost can be reduced by increasing utilization of common products.

At this time, particularly if the connector plate 11a is attached to the opening portion 10a and also, if the lid portion 12b is attached to the opening portion 10b, by connecting the tip end portion of the control cable 3 to the connector of the connector plate 11a and by also connecting a connection cable from the outside of the base 101 (the connection cable 2 from the robot controller 200 and the like, for example) to the connector, it is possible to execute electric connections between the robot controller 200 and the like and the actuators Ac0, Ac1L-Ac7L, and Ac1R-Ac7R through the lower end portion of the base 101. On the other hand, if the connector plate 11b is attached to the opening portion 10b and also, if the lid portion 12a is attached to the opening portion 10a, by connecting the tip end portion of the control cable 3 to the connector of the connector plate 11b and by also connecting a connection cable from the outside of the base 101 (the connection cable 2 from the robot controller 200 and the like, for example) to the connector, it is possible to execute electric connections between the robot controller 200 and the like and the actuators Ac0, Ac1L-Ac7L, and Ac1R-Ac7R through the rear surface of the base 101.

Moreover, particularly in the present embodiment, the pipe P (linking to a support portion) supporting the control cable 3 in the housing 101a is provided in the robot 100 so that the tip end portion of the control cable 3 can be directed to any of the opening portions 10a and 10b. As a result, connection of the control cable 3 to the connector of the connector plate 11a attached to the opening portion 10a and connection of the control cable 3 to the connector of the connector plate 11b attached to the opening portion 10b can be both realized.

Moreover, in the present embodiment, the arm portion 120L and the wrist portion 130L as well as the arm portion 120R and the wrist portion 130R are configured with a multi joint structure. Here, regarding the arm portion 120L and the wrist portion 130L as well as the arm portion 120R and the wrist portion 130R having the multi-joint structure as above, the tip end sides thereof have a tool for performing a desired work for the work target of the robot 100 attached thereto, while the base end sides thereof are rotatably connected to the base 101. That is, the arm portion 120L and the wrist portion 130L as a whole as well as the arm portion 120R and the wrist portion 130R as a whole have a cantilever support structure from the base end sides. Therefore, the arm portion 120L and the wrist portion 130L as well as the arm portion 120R and the wrist portion 130R need to be provided with a support structure on each portion for supporting a gravity portion of each portion, a load portion during acceleration/deceleration and the like, respectively. In the present embodiment, the motor frame 10 of the motor M3 provided on the upper arm A portion 122L, 122R is connected to the strength member Fr2, capable of transmitting stress and also, the motor M3 is connected to the reduction device G3 and the upper arm B portion 123L, 123R, capable of transmitting stress. That is, the motor frame 10 of the motor M3 provided on the upper arm A portion 122L, 122R also serves as a frame assisting member of the upper aim A portion 122L, 122R. As a result, the gravity portion and the load portion during acceleration/deceleration of the upper arm A portion 122L, 122R are supported also by each motor frame 10. As a result, the strength member and the frame structure for supporting the gravity portion and the load portion during acceleration/deceleration can be made small, and thus weight and size of the upper arm A portion 122L, 122R can be reduced.

Moreover, particularly in the present embodiment, the motor M3 provided on the upper arm A portion 122L, 122R is arranged so that the motor shaft 53a extends along the longitudinal direction of the arm portion 120L, 120R. As a result, when the support structure is arranged in the longitudinal direction of the arm portion 120L, 120R in the upper arm A portion 122L, 122R, by using the motor frame 10 also as the frame assisting member, weight and size can be reliably reduced.

Moreover, in the present embodiment, the motor M2 and the reduction device G2 are provided on the shoulder portion 121L, 121R. The rotation driving force output from the motor shaft 52a of the motor M2 is transmitted to the input shaft 52c of the reduction device G2, the speed is reduced at a predetermined reduction ratio in the reduction device G2 and then, transmitted to the upper arm A portion 122L, 122R, and the upper arm A portion 122L, 122R is driven in a predetermined mode. At this time, from a viewpoint of preventing an abrupt operation of the shoulder portion 121L, 121R and the like, the brake device B2 for stopping driving by the motor M2 to the upper arm A portion 122L, 122R is provided.

Here, if the brake device B2 is configured to be integrally incorporated in the motor M2, the motor shaft 52a of the motor M2 and the brake shaft 52b of the brake device B2 are arranged in a linear state, which incurs size increase of the motor M2. Thus, in the present embodiment, the motor shaft 52a and the brake shaft 52b are arranged laterally side by side (instead of the linear arrangement). For that purpose, the pulley 6a is provided on the motor shaft 52a, and the pulley 6b is provided also on the brake shaft 52b, and the driving force is transmitted by winding the belt 7a between the pulley 6a and the pulley 6b. As a result, size can be reduced as compared with the brake-motor integral structure.

Moreover, in the present embodiment, from the viewpoint of preventing size increase caused by linear arrangement in the axial direction as in the above, the input shaft 52c of the reduction device G2 is also arranged laterally side by side with the motor shaft 52a and the brake shaft 52b. For that purpose, the pulley 6c is provided also on the input shaft 52c of the reduction device G2 similarly to the above. That is, a pulley is provided on the motor shaft 52a of the motor M2, the brake shaft 52b of the brake device B2, and the input shaft 52c of the reduction device G2, respectively, and each pulley is connected by a belt. In this case, a structure in which a belt is wound between the motor shaft 52a and the input shaft 52c and another belt is wound between the motor shaft 52a and the brake shaft 52b (the brake shaft 52a, the motor shaft 52b, and the input shaft 52c are arranged in this order) and a structure in which a belt is wound between the motor shaft 52a and the brake shaft 52b and another belt is wound between the brake shaft 52b and the input shaft 52c (the motor shaft 52a, the brake shaft 52b, and the input shaft 52c are arranged in this order) can be considered.

Here, as described above, the motor shaft 52a and the input shaft 52c have dimensions in the axial direction larger than that of the brake shaft 52b. Therefore, if the pulley of the motor shaft 52a and the pulley of the input shaft 52c are directly connected by a belt, a relative positional relationship between the motor shaft 52a and the input shaft 52c is restricted (a need of matching an end portion of the motor shaft 52a with an end portion of the input shaft 52c arises, for example) and space saving when the motor M2 and the reduction device G2 are arranged in entirety becomes difficult.

Thus, in the present embodiment, it is configured such that (the pulley on the motor M2 side and the pulley on the reduction device G2 side are not connected directly) the pulley 6a on the motor M2 side and the pulley 6b on the brake device B2 side are connected by the belt 7a, and the pulley 6b on the brake device B2 side and the pulley 6c on the reduction device G2 side are connected by the belt 7b. As a result, an axial position where the pulley 6a on the motor M2 side and the pulley 6b on the brake device B2 side are connected by the belt 7a and an axial position where the pulley 6b on the brake device B2 side and the pulley 6c on the reduction device G2 side are connected by the belt 7b can be made different from each other. As a result, the relative positional relationship between the motor shaft 52a and the input shaft 52c as described above is not restricted any longer (the end portion of the motor shaft 52a does not have to be matched with the end portion of the input shaft 52c), and by arranging each of the motor M2 and the reduction device G2 appropriately, it is possible to reduce the axial dimensions required for arrangement of the motor M2 and the reduction device G2 in entirety, and to save space.

Moreover, in the present embodiment, on the upper arm B portion 123L, 123R, the motor M4, the reduction device G4, and the brake device B4 are provided. Regarding them, similarly to the above, a pulley is provided in each of the motor shaft 54a of the motor M4, the brake shaft 54b of the brake device B4, and the input shaft 54c of the reduction device G4, and each pulley is connected by a belt. In this case, a structure in which a belt is wound between the motor shaft 54a and the input shaft 54c and another belt is wound between the motor shaft 54a and the brake shaft 54b (the brake shaft 54a, the motor shaft 54b, and the input shaft 54c are arranged in this order) and a structure in which a belt is wound between the motor shaft 54a and the brake shaft 54b and another belt is wound between the brake shaft 54b and the input shaft 54c (the motor shaft 54a, the brake shaft 54b, and the input shaft 54c are arranged in this order) can be considered.

Here, as described above, the motor shaft 54a and the input shaft 54c have dimensions in the axial direction larger than that of the brake shaft 54b. Therefore, if the pulley of the motor shaft 54a and the pulley of the input shaft 54c are directly connected by a belt, a relative positional relationship between the motor shaft 54a and the input shaft 54c is restricted (a need of matching an end portion of the motor shaft 54*a* with an end portion of the input shaft 54*c* arises, for example) and space saving when the motor M4 and the reduction device G4 are arranged in entirety becomes difficult.

Thus, in the present embodiment, it is configured such that (the pulley 14*a* on the motor M4 side and the pulley 14*d* on the reduction device G4 side are not connected directly) the pulley 14*a* on the motor M4 side and the pulley 14*b* on the brake device B4 side are connected by the belt 15*a*, and the pulley 14*c* on the brake device B4 side and the pulley 14*d* on the reduction device G4 side are connected by the belt 15*b*. As a result, an axial position where the pulley 14*a* on the motor M4 side and the pulley 14*b* on the brake device B4 side are connected by the belt 15*a* and an axial position where the pulley 14*c* on the brake device B4 side and the pulley 14*d* on the reduction device G4 side are connected by the belt 15*b* can be made different from each other. As a result, the relative positional relationship between the motor shaft 54*a* and the input shaft 54*c* as described above is not restricted any longer (the end portion of the motor shaft 54*a* no longer has to be matched with the end portion of the input shaft 54*c*), and by arranging each of the motor M4 and the reduction device G4 appropriately, it is possible to reduce the axial dimensions required for arrangement of the motor M4 and the reduction device G4 in entirety, and to save space.

As the result of the above, the entire size of the shoulder portion 121L, 121R on which the motor M2, the reduction device G2, and the brake device B2 are arranged, the upper arm B portion 123L, 123R on which the motor M4, the reduction device G4, and the brake device B4 are arranged, and the arm portion 120L, 120R can be reduced.

Moreover, particularly in the present embodiment, the motor M2, the reduction device G2, and the brake device B2 provided on the shoulder portion 121L, 121R are arranged so that the motor shaft 52*a*, the brake shaft 52*b*, and the input shaft 52*c* are in parallel with each other. As a result, the lateral arrangement of the motor shaft 52*a* of the motor M2, the brake shaft 52*b* of the brake device B2, and the input shaft 52*c* of the reduction device G2 described above can be reliably realized, and the size of the shoulder portion 121L, 121R can be reliably reduced. Moreover, the motor M4, the brake device B4, and the reduction device G4 provided on the upper arm B portion 123L, 123R are arranged so that the motor shaft 54*a*, the brake shaft 54*b*, and the input shaft 54*c* are in parallel with each other. As a result, the lateral arrangement of the motor shaft 54*a* of the motor M4, the brake shaft 54*b* of the brake device B4, and the input shaft 54*c* of the reduction device G4 described above can be reliably realized, and the size of the upper arm B portion 123L, 123R can be reliably reduced.

Moreover, particularly in the present embodiment, the motor shaft 52*a* of the motor M2, the brake shaft 52*b* of the brake device B2, and the input shaft 52*c* of the reduction device G2 provided on the shoulder portion 121L, 121R are arranged along the direction orthogonal to the longitudinal direction of the arm portion 120L, 120R. If the motor shaft 52*a* of the motor M2, the brake shaft 52*b* of the brake device B2, and the input shaft 52*c* of the reduction device G2 which are in parallel with each other are arranged in the direction orthogonal to the longitudinal direction of the arm portion 120L, 120R (in other words, in the thickness direction of the arm portion 120L, 120R), if the axial dimension of each shaft is large, the diameter of the arm portion 120L, 120R is increased. Moreover, the motor shaft 54*a* of the motor M4, the brake shaft 54*b* of the brake device B4, and the input shaft 54*c* of the reduction device G4 provided on the upper arm B portion 123L, 123R are arranged in the direction orthogonal to the longitudinal direction of the arm portion 120L, 120R. If the motor shaft 54*a* of the motor M4, the brake shaft 54*b* of the brake device B4, and the input shaft 54*c* of the reduction device G4 which are in parallel with each other are arranged in the direction orthogonal to the longitudinal direction of the arm portion 120L, 120R (in other words, in the thickness direction of the arm portion 120L, 120R), if the axial dimension of each shaft is large, the diameter of the arm portion 120L, 120R is increased. Therefore, by applying the aforementioned configuration to such arrangement, it is possible to particularly effectively prevent diameter increase of the arm portion 120L, 120R.

Moreover, particularly in the present embodiment, in the brake shaft 54*b* of the brake device B4 provided in the upper arm B portion 123L, the belt connection with the pulley 14*a* on the motor M4 side is performed on the pulley 14*b* provided on one side in the second axial direction, and the belt connection with the pulley 14*d* on the reduction device G4 side is performed on the pulley 14*c* provided on the other side in the axial direction. By performing connection between the motor M4 side and the reduction device G4 side on the pulleys 14*b* and 14*c* provided at separate positions on the brake shaft 54*b* as described above, it is possible to reliably eliminate the aforementioned restriction on the relative positional relationship between the motor shaft 54*a* and the input shaft 54*c*, and to reliably reduce the entire size of the upper arm B portion 123L and the arm portion 120L, 120R.

Moreover, in the present embodiment, the wrist portion 130L, 130R having the multi-joint structure is connected to the tip end side of the arm portion 120L, 120R. The wrist portion 130L, 130R is connected rotatably with respect to each other in the order of the wrist A portion 131L, 131R, the wrist B portion 132L, 132R, and the flange portion 133L, 133R from the arm portion 120L, 120R side to the tip end side.

At this time, in the connection structure between the flange portion 133L, 133R and the wrist B portion 132L, 132R, they are connected rotatably around the rotation axis line Ax7L, Ax7R along the longitudinal direction of the wrist portion 130L, 130R. On the other hand, in the connection structure (hereinafter referred to as a second connection structure) between the wrist B portion 132L, 132R and the wrist A portion 131L, 131R, they are connected rotatably around the swing axis line Ax6L, Ax6R along the direction (in other words, in the thickness direction of the wrist portion 130L, 130R) orthogonal to the longitudinal direction of the wrist portion 130L, 130R. Similarly, in the connection structure (hereinafter referred to as a first connection structure) between the wrist A portion 131L, 131R and the arm portion 120L, 120R, they are connected rotatably around the swing axis line Ax5L, Ax5R along the direction (in other words, in the thickness direction of the wrist portion 130L, 130R) orthogonal to the longitudinal direction of the wrist portion 130L, 130R.

As described above, in the first connection structure or the second connection structure, the swing axis line Ax5L, Ax5R or the swing axis line Ax6L, Ax6R is arranged in the thickness direction of the wrist portion 130L, 130R. As a result, with a configuration in which the rotation speed of the driving motor is reduced by using a normal gear mechanism, axis line of each gear of the gear mechanism and the motor shaft of the driving motor are both aligned along the swing axis line Ax5L, Ax5R or the swing axis line Ax6L, Ax6R, and thus, the thickness of the wrist portion 130L, 130R or the arm portion 120L, 120R is increased for installation thereof.

Thus, in the present embodiment, instead of the normal gear mechanism, the Hypoid gear sets G5 and G6 are used. The Hypoid gear sets G5 and G6 have gear arrangement in which the axis lines Axa and Axe of the pinion gears G5a and G6a which are driving gears and the axis lines Axb and Axd of the ring gears G5b and G6b which are driven gears are orthogonal to each other. Regarding the first connection structure, the ring gear G5b is arranged so that the axis line Axb extends along the thickness direction of the wrist portion 130L, 130R, while the pinion gear G5a and the motor shaft 55a are arranged so that the axis line Axa extends along the longitudinal direction of the wrist portion 130L, 130R or the arm portion 120L, 120R. Similarly, regarding the second connection structure, too, the ring gear G6b is arranged so that the axis line Axd extends along the thickness direction of the wrist portion 130L, 130R, while the pinion gear G6a and the motor shaft 56a are arranged so that the axis line Axc extends along the longitudinal direction of the wrist portion 130L, 130R or the arm portion 120L, 120R.

As a result, in the present embodiment, dimension increase in the thickness direction of the wrist portion 130L, 130R or the arm portion 120L, 120R is suppressed, and the wrist portion 130L, 130R or the arm portion 120L, 120R can be made thinner (flattened).

Moreover, particularly in the present embodiment, the wrist B portion 132L, 132R is supported swingably around the swing axis line Ax6L, Ax6R orthogonal to the longitudinal direction of the wrist portion 130L, 130R and orthogonal to the swing axis line Ax5L, Ax5R. As a result, in a configuration in which the swing axis line Ax5L, Ax5R around which the wrist A portion 131L, 131R is supported swingably and the swing axis line Ax6L, Ax6R around which the wrist B portion 132L, 132R is supported swingably are at skew positions with respect to each other, dimension increase in the thickness direction of the wrist portion 130L, 130R or the arm portion 120L, 120R can be suppressed and made thinner (flattened).

Moreover, particularly in the present embodiment, the motor M5 is provided on the tip end portion of the arm portion 120L, 120R, and the motor M6 is provided on the wrist A portion 131L, 131R. As a result, diameter increase of the arm portion 120L, 120R on which the motor M5 is arranged is prevented and made thinner (flattened), and diameter increase of the wrist A portion 131L, 131R on which the motor M6 is arranged can be prevented and made thinner (flattened)

Moreover, particularly in the present embodiment, the Hypoid gear set G5 is provided with the pinion gear G5a to which rotation from the motor M5 is input and the ring gear G5b meshed with the pinion gear G5a for driving the wrist A portion 131L, 131R. Moreover, the Hypoid gear set G6 is provided with the pinion gear G6a to which rotation from the motor M6 is input and the ring gear G6b meshed with the pinion gear G6a for driving the wrist B portion 132L, 132R. By inputting and transmitting the driving force from the motors M5 and M6 to the pinion gears G5a and G6a, it is possible to prevent diameter increase of the arm portion 120L, 120R or the wrist A portion 131L, 131R by making the diameters of the pinion gears G5a and G6a small as appropriate.

Moreover, particularly in the present embodiment, the motor M5 is provided so that the motor shaft 55a extends along the longitudinal direction of the arm portion 120L, 120R, the pinion gear G5a is provided so that the axis line Axa extends along the longitudinal direction of the arm portion 120L, 120R, and the ring gear G5b is provided so that the axis line Axb is orthogonal to the longitudinal direction of the arm portion 120L, 120R. Moreover, the motor M6 is provided so that the motor shaft 56a extends along the longitudinal direction of the wrist A portion 131L, 131R, the pinion gear G6a is provided so that the axis line Axc extends along the longitudinal direction of the wrist A portion 131L, 131R, and the ring gear G6b is provided so that the axis line Axd is orthogonal to the longitudinal direction of the wrist A portion 131L, 131R. As a result, it is possible to reliably prevent diameter increase of the arm portion 120L, 120R caused by arrangement of the motor M5 and the pinion gear G5a, and to reliably prevent diameter increase of the wrist A portion 131L, 131R caused by arrangement of the motor M6 and the pinion gear G6a.

Moreover, in the present embodiment, the arm portion 120L, 120R and the wrist portion 130L, 130R are configured with the multi joint structure. Each of the arm portion 120L, 120R and the wrist portion 130L, 130R is driven by means of transmission of the driving force from each of the actuators Ac1L-Ac7L and Ac1R-Ac7R operating on the basis of control of the robot controller 200. In each of the arm portion 120L, 120R and the wrist portion 130L, 130R, the frame members Fr1-Fr6 which are support structure for the gravity portion and the load portion during acceleration/deceleration are covered by the elastic outer skin 40b, and the surface outer skin of each portion is constituted by this elastic outer skin 40b. As a result, even assuming that the arm portion 120L, 120R interferes with the article or human body in the periphery during operation of the arm portion 120L, 120R, the impact at the interference is largely absorbed and alleviated by an elastic force of the elastic body constituting the elastic outer skin 40b. As a result, force acting on the article or human body can be remarkably reduced and thus, maximum safety can be ensured and safety can be further improved. As a result, a safety fence which had to be installed in the periphery of the robot 100 in order to ensure safety can be eliminated.

Moreover, particularly in the present embodiment, each portion of the arm portion 120L, 120R and the wrist portion 130L, 130R is provided with the contact switch 41 for detecting contact, from the outside, with the elastic outer skin 40b. As a result, if interference with the article or human body in the periphery of the arm portion 120L, 120R occurs, the interference can be reliably detected by the contact switch 41.

Moreover, particularly in the present embodiment, the contact switch 41 is a three-way contact switch capable of detecting contact with the elastic outer skin 40b from three directions orthogonal to each other. As a result, in the case of interference between the arm portion 120L, 120R and the article or human body in the periphery, from whatever direction contact occurs with each portion, the contact can be reliably detected.

Moreover, particularly in the present embodiment, the robot controller 200 is provided with the operation control portion 202a capable of reducing the speed of or stopping the operation of the actuator driving each portion in which the contact switch 41 is provided on the basis of a detection signal output from the contact switch 41. As a result, in the case of interference with the article or human body in the periphery of the arm portion 120L, 120R, the subsequent operation of the arm portion 120L, 120R can be decelerated or stopped by the control of the robot controller 200. As a result, safety can be further ensured.

The embodiment is not limited to the aforementioned contents but capable of various variations within a range not departing from the gist and technical idea thereof. For example, in this embodiment, the motor M3 provided on the upper arm A portion 122L, 122R is arranged so that the motor shaft 53a extends along the longitudinal direction of the arm portion 120L, 120R. However, this is not limiting, and the motor M3 provided on the upper arm A portion 122L, 122R may be arranged so that the motor shaft 53a extends along the direction substantially orthogonal to the longitudinal direction of the arm portion 120L, 120R. In this case, even if the support structure for the gravity portion and the load portion during acceleration/deceleration in the upper arm A portion 122L, 122R needs to be arranged in the direction orthogonal to the longitudinal direction of the arm portion 120L, 120R (in other words, in the thickness direction of the arm portion 120L, 120R), it is possible to reliably reduce the weight and size by using the motor frame 10 also as the frame assisting member.

Moreover, in the above described embodiment, the motor frame 10 of the motor M3 provided on the upper arm A portion 122L, 122S also serves as the frame assisting member of the upper arm A portion 122L, 122R. However, this is not limiting, and a motor frame of a motor provided on each portion other than the upper arm A portion 122L, 122R may also serve as the frame assisting member of the portion.

Moreover, in the above described embodiment, each of the motors M2-M7 is provided on a portion separate from a portion to be driven in the arm portion 120L, 120R and the wrist portion 130L, 130R, but this is not limiting. For example, each of the motors M2-M7 may be provided on a portion to be driven in the arm portion 120L, 120R and the wrist portion 130L, 130R.

Moreover, in this embodiment, the so-called double-arm robot, that is, the robot main body 102 having two arm portions 120L and 120R and the wrist portions 130L and 130R was described, but this is not limiting. For example, the robot main body may be a so-called single-arm robot, that is, a robot having one arm portion and one wrist portion or a robot having three or more arm portions and wrist portions.

Moreover, arrows in FIG. 23 illustrate an example of flows of signals and do not limit the flow direction of the signals.

Moreover, other than those described above, methods of the aforementioned embodiment and the variations may be used in combination as appropriate.

Though not individually exemplified, the aforementioned embodiment and the variations are put into practice with various changes added within a range not departing from the gist thereof.

What is claimed is:

1. A robot comprising:
 a base installed at an installation surface of an installation spot of the robot; and
 a robot main body arranged on the base swingably around a swing axis line, and including a plurality of structural members driven by a plurality of actuators,
 the base including:
  a housing into which a control cable drawn from the plurality of actuators is introduced;
  a first opening portion provided on a surface on a side of the installation surface of the housing; and
  a second opening portion provided on a side surface of the housing,
 the first opening portion comprising a first attach/detach part configured to selectively attach/detach either one of a first connector plate including a connector to which a tip end portion of the control cable is configured to be attached and a first lid portion not including the connector; and
 the second opening portion comprising a second attach/detach part configured to selectively attach/detach either one of a second connector plate including a connector to which the tip end portion of the control cable is configured to be attached and a second lid portion not including the connector,
 the first connector plate is attached to the first attach/detach part of the first opening portion and is positioned at a portion on the side of the installation surface of the base, and
 the second lid portion is attached to the second attach/detach part of the second opening portion,
 the robot further comprising:
  a support portion configured to introduce the control cable into the housing along the swing axis line, and to support the control cable inside the housing so that the tip end portion of the control cable can be directed to any of the first opening portion and the second opening portion;
  a motor mounted within the housing, the motor arranged at a position offset from the swing axis line in a first direction being vertical to the swing axis line, the motor being configured to generate a rotation driving force for swinging the robot main body around the swing axis line;
  a brake device mounted within the housing, the brake device arranged at a position offset from the swing axis line in a second direction being vertical to the swing axis line and different from the first direction, the brake device being configured to brake or hold rotation of the motor; and
  a reduction device mounted on the housing and comprising an input shaft and an output shaft, both of the input shaft and the output shaft being arranged along the swing axis line and having a hollow structure, and
 wherein the support portion is disposed inside the input shaft and the output shaft,
 wherein the first connector plate is provided with a connector group including the connectors of a same kind, and
 wherein the connectors of the same kind are arranged along a circumferential direction with respect to the swing axis line.

2. The robot according to claim 1, wherein the base is formed of casting.

3. The robot according to claim 1, wherein the first connector plate is positioned at a portion on the side of the installation surface of the robot.

4. A robot comprising:
 a base installed at an installation surface of an installation spot of the robot; and
 a robot main body arranged on the base swingably around a swing axis line, and including a plurality of structural members driven by a plurality of actuators,
 the base including:
  a housing into which a control cable drawn from the plurality of actuators is introduced;
  a first opening portion provided on a surface on a side of the installation surface of the housing; and
  a second opening portion provided on a side surface of the housing, the first opening portion comprising a first attach/detach part configured to selectively attach/detach either one of a first connector plate including a connector to which a tip end portion of the control cable is configured to be attached and a first lid portion not including the connector; and the second opening portion comprising a second attach/detach part configured to selectively attach/detach either one of a second connector plate including a connector to which the tip end portion of the control cable is configured to be attached and a second lid portion not including the connector, the second connector plate is attached to the second attach/detach part of the second opening portion, and the first lid portion is attached to the first attach/detach part of the first opening portion and is positioned at a portion on the side of the installation surface of the base, the robot further comprising:
- a support portion configured to introduce the control cable into the housing along the swing axis line, and to support the control cable inside the housing so that the tip end portion of the control cable can be directed to any of the first opening portion and the second opening portion;
- a motor mounted within the housing, the motor arranged at a position offset from the swing axis line in a first direction being vertical to the swing axis line, the motor being configured to generate a rotation driving force for swinging the robot main body around the swing axis line;
- a brake device mounted within the housing, the brake device arranged at a position offset from the swing axis line in a second direction being vertical to the swing axis line and different from the first direction, the brake device being configured to brake or hold rotation of the motor; and
- a reduction device mounted on the housing and comprising an input shaft and an output shaft, both of the input shaft and the output shaft being arranged along the swing axis line and having a hollow structure, and wherein the support portion is disposed inside the input shaft and the output shaft, wherein the second connector plate is provided with a connector group including the connectors of a same kind, and wherein the connectors of the same kind are arranged in parallel with the installation surface.

5. The robot according to claim 4, wherein the base is formed of casting.

6. The robot according to claim 4, wherein the first lid portion is positioned at a portion on the side of the installation surface of the robot.

7. The robot according to claim 4, wherein the connectors of the same kind are all arranged along a straight line in parallel with the installation surface.

8. The robot according to claim 4,
wherein the second connector plate is provided with an additional connector group including the connectors of a same second kind, and
wherein the connectors of the same second kind are arranged in parallel with the installation surface.

9. The robot according to claim 8, wherein the connectors of the same second kind are all arranged along a second straight line in parallel with the installation surface.

* * * * *